US008807847B2

(12) United States Patent
Ito

(10) Patent No.: US 8,807,847 B2
(45) Date of Patent: Aug. 19, 2014

(54) LENS BARREL AND IMAGING DEVICE

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 12 days.

(21) Appl. No.: 13/443,868

(22) Filed: Apr. 10, 2012

(65) Prior Publication Data

US 2012/0200768 A1 Aug. 9, 2012

Related U.S. Application Data

(63) Continuation of application No. PCT/JP2011/003039, filed on May 31, 2011.

(30) Foreign Application Priority Data

Feb. 9, 2011 (JP) ................................. 2011-026549

(51) Int. Cl.
*G03B 17/04* (2006.01)
*G03B 3/10* (2006.01)

(52) U.S. Cl.
USPC ........................................... 396/349; 396/133

(58) Field of Classification Search
USPC .................................................. 396/349, 133
See application file for complete search history.

(56) References Cited

U.S. PATENT DOCUMENTS 5,661,609 A 8/1997 Asakura et al.
5,739,962 A 4/1998 Asakura et al.
6,023,376 A 2/2000 Nomura et al.
6,954,588 B2 10/2005 Murakami
7,088,916 B2 * 8/2006 Nomura .......................... 396/73
7,103,272 B2 * 9/2006 Baxter .......................... 392/454
7,130,132 B2 * 10/2006 Lee .............................. 359/704
7,228,068 B2 * 6/2007 Koyama .......................... 396/87
7,546,029 B2 * 6/2009 Ishizuka et al. ................. 396/73
7,663,810 B2 2/2010 Watanabe et al.
7,899,312 B2 * 3/2011 Iijima et al. ..................... 396/55
2009/0033751 A1 * 2/2009 Hasuda .................... 348/208.99

FOREIGN PATENT DOCUMENTS

JP H01-277810 A 11/1989
JP H05-034563 A 2/1993
JP H07-020371 A 1/1995
JP H10-115759 A 5/1998
JP 2003-344747 A 12/2003
JP 2004-151137 A 5/2004
JP 2004-258312 A 9/2004

(Continued)

OTHER PUBLICATIONS

International Search Report of PCT Application No. PCT/JP2011/003039.

(Continued)

*Primary Examiner* — Clayton E Laballe
*Assistant Examiner* — Leon W Rhodes, Jr.
(74) *Attorney, Agent, or Firm* — Shinjyu Global IP

(57) ABSTRACT

An interchangeable lens unit is provided that includes a lens housing, a cam frame, a zoom motor mounted to the lens housing, and a transmission mechanism. The zoom motor has a zoom driveshaft that outputs a driving force. The transmission mechanism is configured to transmit the driving force from the zoom driveshaft to the cam frame. The lengthwise direction of the zoom motor is oriented differently than the direction of the optical axis. When viewed along the direction of the optical axis, the zoom motor is disposed on the inner peripheral side of the cam frame.

41 Claims, 21 Drawing Sheets

(56) References Cited

FOREIGN PATENT DOCUMENTS

| | | | |
|---|---|---|---|
| JP | 2007-093711 | A | 4/2007 |
| JP | 2007-212505 | A | 8/2007 |
| JP | 2008-176128 | A | 7/2008 |
| JP | 2010-266749 | A | 11/2010 |

OTHER PUBLICATIONS

International Search Report of co-pending PCT Application No. PCT/JP2011/003042.

Non-final Office Acrion for co-pending U.S. Appl. No. 13/640,736, issued Jan. 30, 2014.

* cited by examiner

LENS BARREL AND IMAGING DEVICE

CROSS-REFERENCE TO RELATED APPLICATIONS

This application is a continuation of PCT Patent Application No. PCT/JP2011/003039, which claimed priority to Japanese Patent Application No. 2011-026549, filed on Feb. 9, 2011. The entire disclosure of PCT Patent Application No. PCT/JP2011/003039 and Japanese Patent Application No. 2011-026549 are hereby incorporated herein by reference.

BACKGROUND

1. Technical Field

The technology disclosed herein relates to a lens barrel used in an imaging device.

2. Description of the Related Art

Imaging devices that produce image data about a subject have rapidly been gaining popularity in recent years. A lens barrel for adjusting the focal distance is installed in an imaging device. Known imaging devices include, for example, integrated types of cameras and those with an interchangeable lens. Integrated cameras have the lens barrel built in. An interchangeable lens camera has a camera body and an interchangeable lens unit that can be mounted to and removed from the camera body. The lens barrel in this case is built into the interchangeable lens unit, for example.

SUMMARY

An actuator is built into this type of lens barrel. Examples of actuators include a zoom motor used to adjust the focal distance, and a focus motor used to focus on the desired main subject.

These actuators have a rotating shaft, and transmit rotational force through a gear or other such member to a support frame. This allows the support frame to be moved in the optical axis direction or rotated.

With the lens barrels discussed above, however, since the rotating shaft is parallel to the optical axis, a relatively large installation space is required in the optical axis direction as space for installing the actuator.

In view of this, a lens barrel has been proposed in which the rotating shaft of the actuator is disposed in a plane that is perpendicular to the optical axis.

However, with this lens barrel, a zoom motor and a zoom cam ring driven by the zoom motor are disposed aligned in the optical axis direction, and this makes it difficult to obtain a compact lens barrel.

One object of the technology disclosed herein is to provide a lens barrel that is more compact.

The lens barrel disclosed herein comprises a first frame, a second frame, a first actuator, and a transmission mechanism. The second frame is supported by the first frame and configured to rotate about an optical axis. The first actuator is mounted to the first frame and, when viewed along the direction of the optical axis, disposed adjacent to an inner peripheral side of the second frame, the first actuator frame being configured to output a drive force. The transmission mechanism is configured to transmit the drive force to the second frame. The lengthwise direction of the first actuator is oriented differently than the direction of the optical axis.

The first actuator here may be a motor or a piezoelectric actuator, for example. The "lengthwise direction of the first actuator" may mean a direction parallel to the longest side of an imaginary cuboid defined as being the smallest imaginary cuboid in which the first actuator will fit.

With this lens barrel, since the lengthwise direction of the first actuator is oriented differently than the direction of the optical axis, the region occupied by the first actuator in the optical axis direction can be smaller than when the lengthwise direction of the first actuator is disposed parallel to the optical axis direction. This means that the space around the first actuator can be utilized more effectively.

Furthermore, when viewed along the direction of the optical axis, the first actuator is disposed adjacent to the inner peripheral side of the second frame. Therefore, the length of the lens barrel in the optical axis direction can be shortened as compared to that when the first actuator and the second frame are disposed aligned in the optical axis direction.

This allows the lens barrel to be more compact.

This same reduction in size is possible with an imaging device equipped with the lens barrel.

BRIEF DESCRIPTION OF DRAWINGS

Referring now to the attached drawings, which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Overview of Digital Camera

Figure 1:
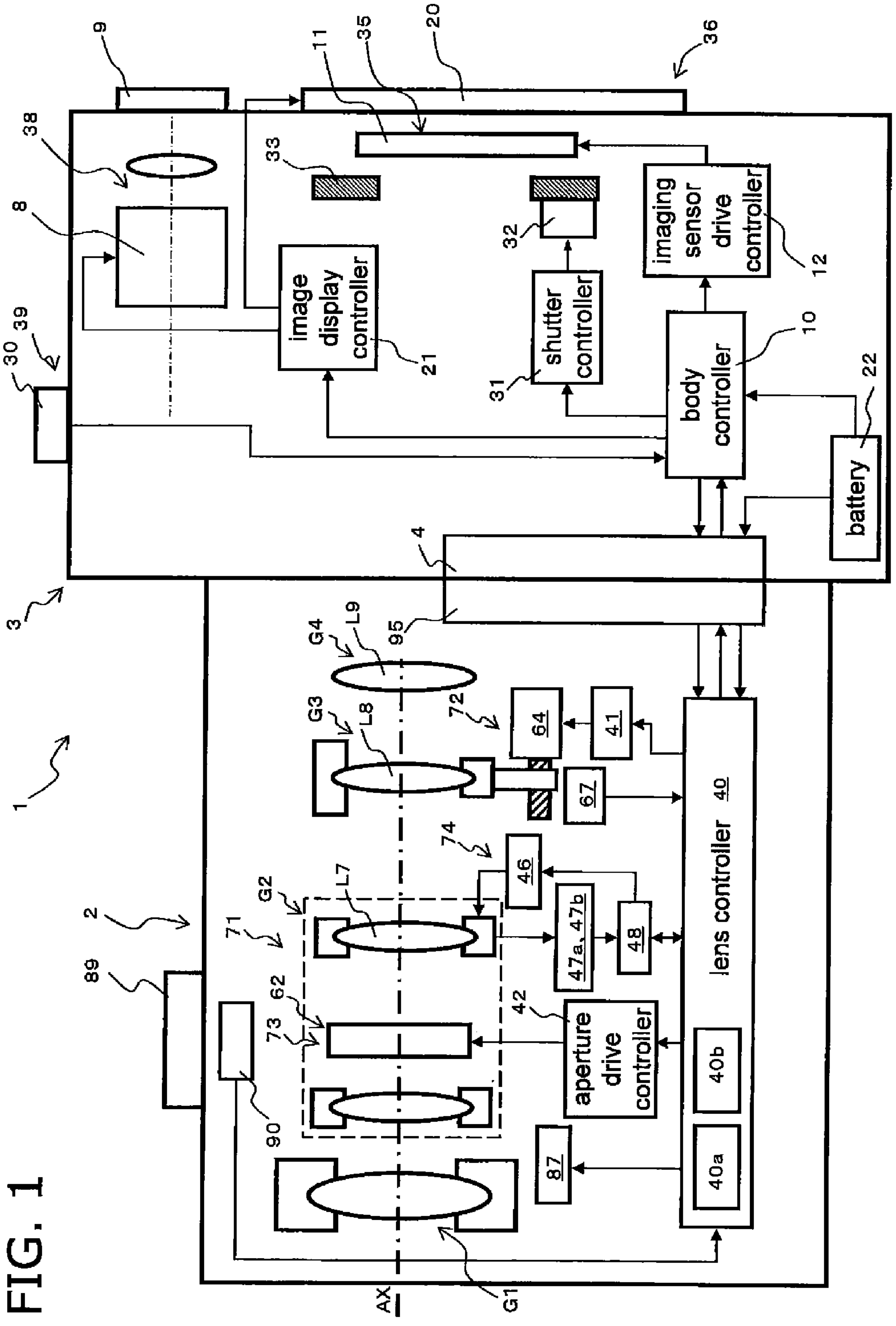
FIG. 1 is a diagram of the simplified configuration of a digital camera 1.
Figure 2:
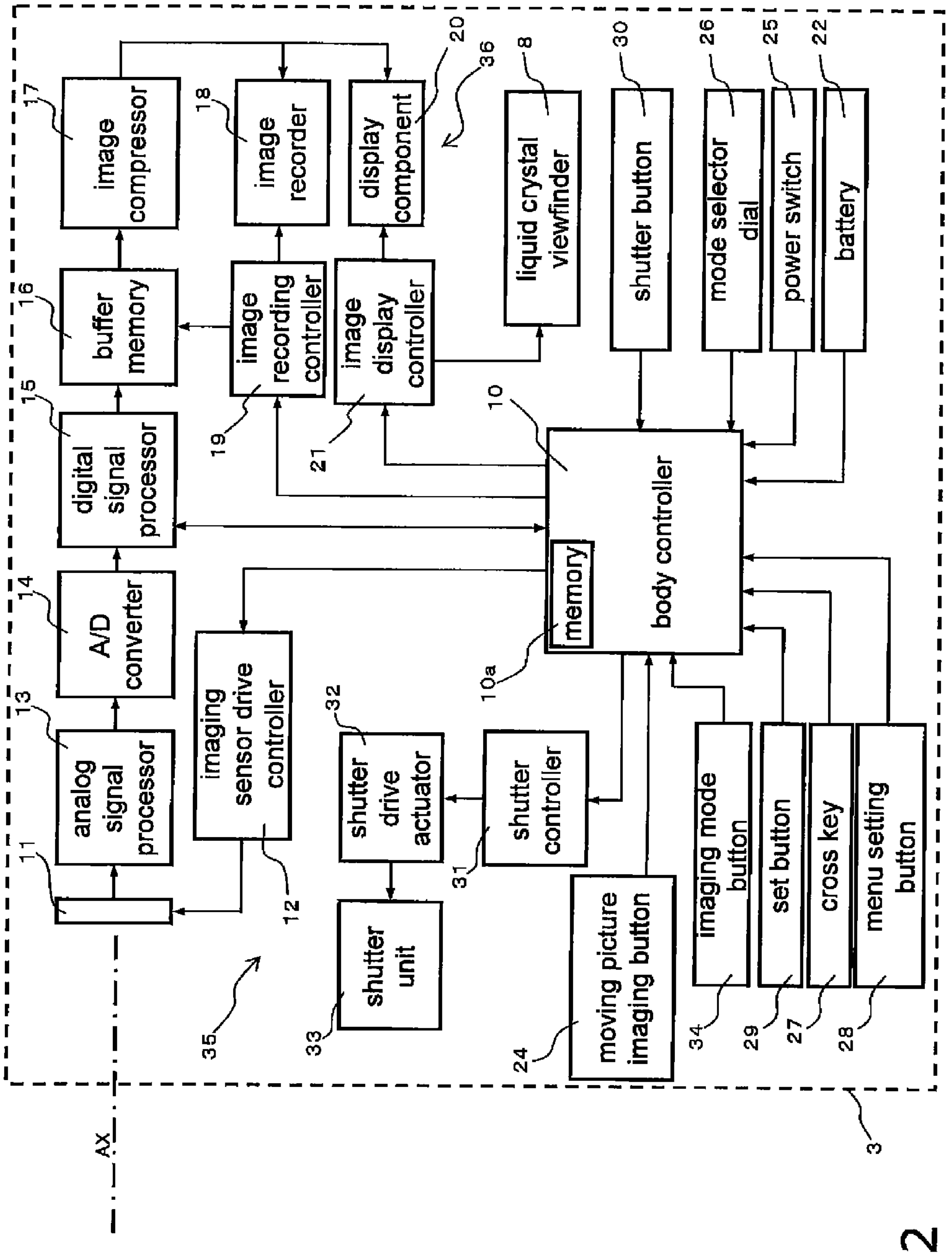
FIG. 2 is a block diagram of a camera body 3.

A digital camera 1 will be described through reference to FIGS. 1 to 3B. As shown in FIG. 1, the digital camera 1 (one example of an imaging device) is an interchangeable lens type of digital camera, and mainly comprises a camera body 3 (one example of a camera body) and an interchangeable lens unit 2 (one example of a lens barrel) that is removably mounted to the camera body 3. The interchangeable lens unit 2 is removably mounted to a body mount 4 provided to the front face of the camera body 3, via a lens mount 95.

This digital camera 1 is what is known as a mirror-less single-lens camera, in which no quick-return mirror is installed between the body mount 4 and an imaging sensor 11.

Simplified Configuration of Interchangeable Lens Unit

The simplified configuration of the interchangeable lens unit 2 will be described through reference to FIG. 1 and FIGS. 4 to 7. As shown in FIG. 1, the interchangeable lens unit 2 has an optical system O, a lens support mechanism 71 that supports the optical system O, a focus adjusting unit 72, an aperture adjustment unit 73, a blur correction unit 74, and a lens controller 40. Each of these will be described below.

(1) Optical System

The optical system O is a lens system for forming an optical image of a subject. More specifically, as shown in FIGS. 6 and 7, the optical system O has a first lens group G1, a second lens group G2, a third lens group G3, and a fourth lens group G4. The optical system O has an optical axis AX defined by these lens groups. A direction parallel to the optical axis AX will hereinafter be called the optical axis direction.

The first lens group G1 is disposed closest to the subject side of all these lens groups, and has a first lens L1, a second lens L2, and a third lens L3. The second lens group G2 has a fourth lens L4, a fifth lens L5, a sixth lens L6, and a seventh lens L7. The seventh lens L7 is a correcting lens that corrects image blur caused by movement of the digital camera 1, and is disposed movably along a plane that is perpendicular to the optical axis direction. The third lens group G3 has an eighth lens L8 that functions as a focusing lens. The eighth lens L8 is disposed movably in the optical axis direction. The fourth lens group G4 is disposed closest to the image side of all these lens groups, and has a ninth lens L9.

(2) Lens Support Mechanism

Figure 5:
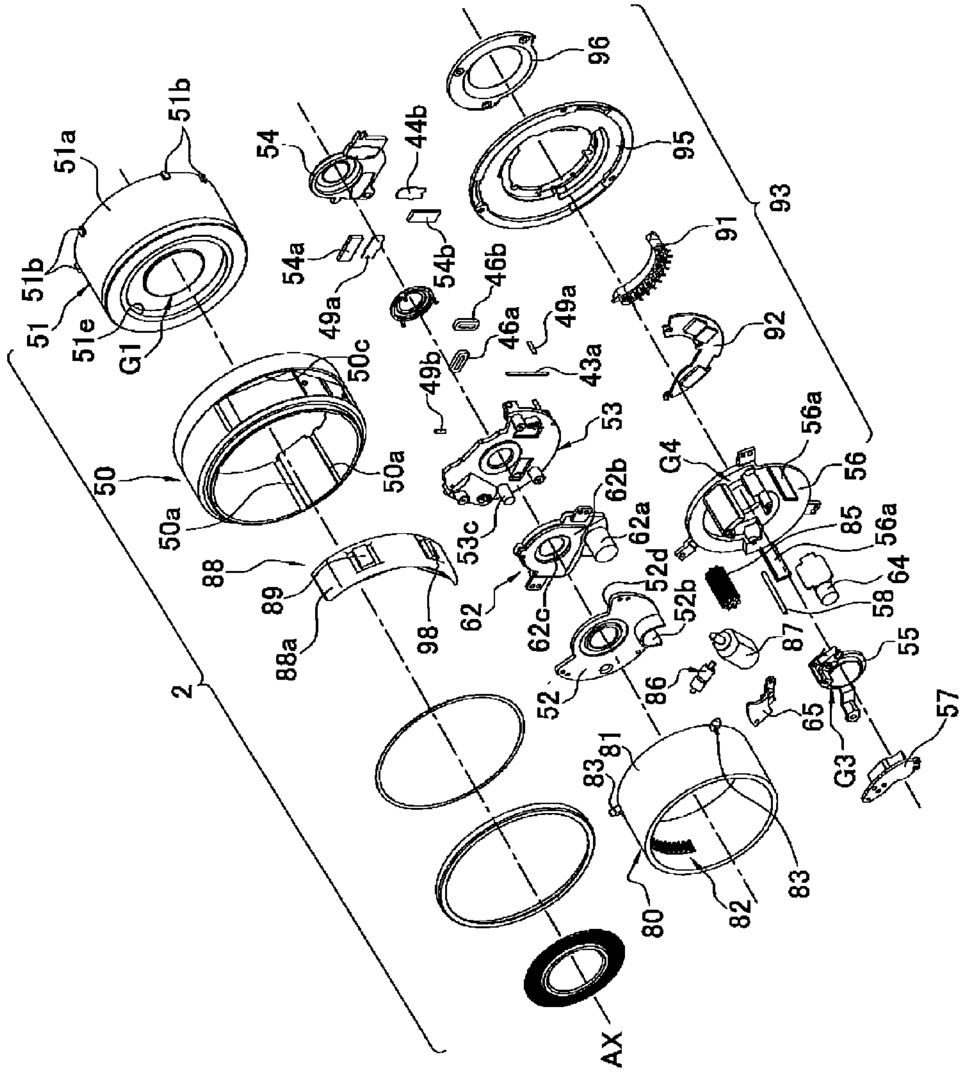
FIG. 5 is an exploded perspective view of the interchangeable lens unit 2.

The lens support mechanism 71 is used to support the first to fourth lens groups G1 to G4. As shown in FIG. 5, the lens support mechanism 71 has a lens housing 2*a* (FIG. 4), a cam frame 80, a first lens support frame 51, a second lens support frame 69, a third lens support frame 55 (one example of a focus adjusting frame), a lens-side contact unit 91, an electrical board 92, an interface lever unit 88, and an aperture unit 62.

(2-1) Lens Housing 2*a*

The lens housing 2*a* (one example of a first frame) constitutes part of the outer case of the interchangeable lens unit 2, and has a base member 93 (one example of a base member) and a fixed frame 50 (one example of an outer frame).

The base member 93 has a lens mount 95, a light blocking frame 96, and a fourth lens support frame 56. The base member 93 is fixed to the end of the fixed frame 50.

The lens mount 95 (one example of a lens mount) is an annular member that is mounted to the body mount 4 of the camera body 3, and has a bayonet 95*a* (see FIG. 18A) that is configured to be linked to the body mount 4. The light blocking frame 96, which blocks out unwanted light, is attached to the lens mount 95. The fourth lens support frame 56 is also fixed to the lens mount 95.

The fourth lens group G4 is fixed to the fourth lens support frame 56. That is, the fourth lens group G4 is a lens group that does not move in the optical axis direction. The fourth lens support frame 56 has a support frame main body 56*b* and two rectilinear guide plates 56*a* that extend in the optical axis direction from the support frame main body 56*b*. The rectilinear guide plates 56*a* are inserted into rectilinear guide grooves 53*k* (discussed below) of a moving frame 53 respectively, and restrict the rotation of the second lens support frame 69. The rectilinear guide plates 56*a* are disposed on the inner peripheral side of the cam frame 80.

As discussed below, a zoom motor 87, a transmission mechanism 84 and a focus motor 64 are mounted to the base member 93. In this embodiment, the zoom motor 87, the transmission mechanism 84, and the focus motor 64 are fixed to the fourth lens support frame 56.

Figure 8A:
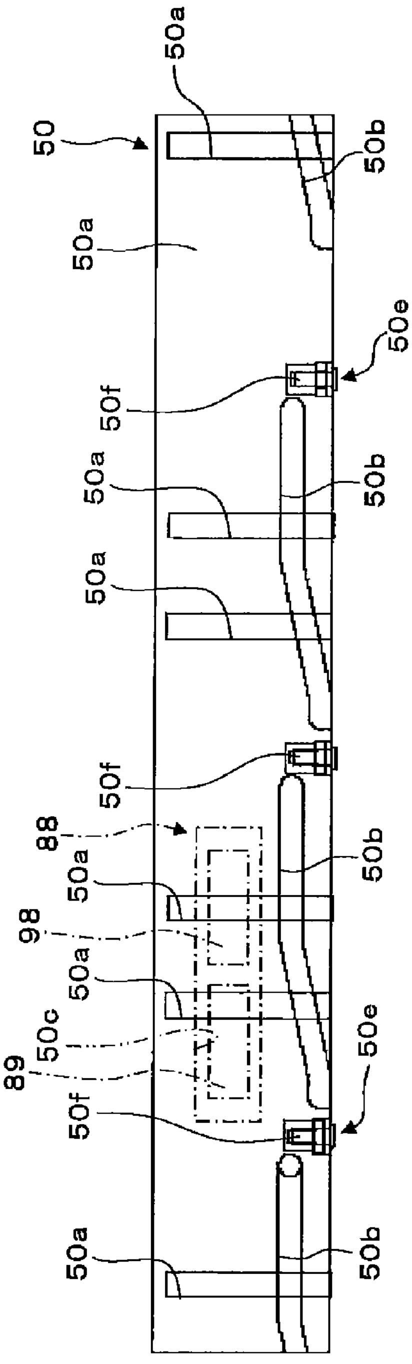
FIG. 8A is an inner peripheral development view of a fixed frame 50.

The fixed frame 50 is fixed by three screws 50*f* to the outer peripheral part of the lens mount 95. The fixed frame 50 is a substantially cylindrical member that rotatably supports the cam frame 80. As shown in FIG. 8A, the fixed frame 50 has a plurality of rectilinear grooves 50*a* formed on its inner peripheral face. The rectilinear grooves 50*a* extend in the optical axis direction, and guide rectilinear protrusions 51*b* (discussed below) of the first lens support frame 51 in the optical axis direction. Since the rectilinear protrusions 51*b* are guided in the optical axis direction by the rectilinear grooves 50*a*, the first lens support frame 51 is able to move in the optical axis direction without rotating with respect to the fixed frame 50.

As shown in FIG. 8A, the fixed frame 50 has three guide cam grooves 50*b* formed on its inner peripheral face. The guide cam grooves 50*b* are provided in order to guide the cam frame 80 in the optical axis direction. Guide cam followers 83 (discussed below) of the cam frame 80 are inserted into the guide cam grooves 50*b*.

Also, the fixed frame 50 is fixed to the lens mount 95 of the base member 93 by three screws 50*f*. Here, the portions where the fixed frame 50 is fixed to the base member 93 by the screws 50*f* will be called the fixed components 50*e*. The three fixed components 50*e* are disposed equidistantly spaced in the circumferential direction. Also, the three fixed components 50*e* are disposed between the three guide cam grooves 50*b* in the circumferential direction, and do not interfere with the guide cam grooves 50*b*. It could also be said that the three guide cam grooves 50*b* are disposed between the three fixed components 50*e* in the circumferential direction.

A concave component 50*c* is formed on the outer peripheral face of the fixed frame 50. The interface lever unit 88 (discussed below) is fitted into this concave component 50*c*. The concave component 50*c* is disposed more toward the subject side (the opposite side from the image plane) than the guide cam grooves 50*b*.

2-2 Lens-side Contact Unit 91

Figure 18A:
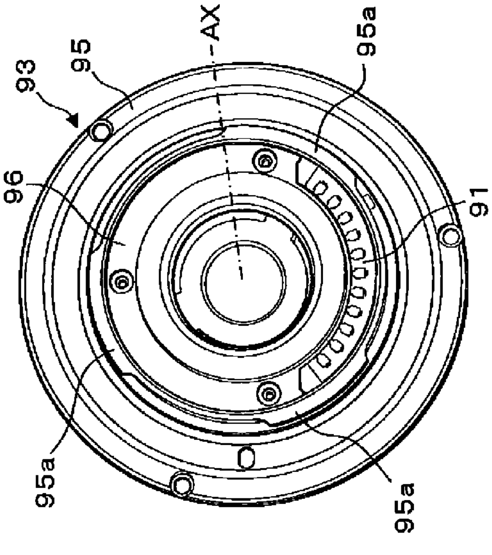
FIG. 18A is an oblique perspective view of a base member 93.
Figure 18B:
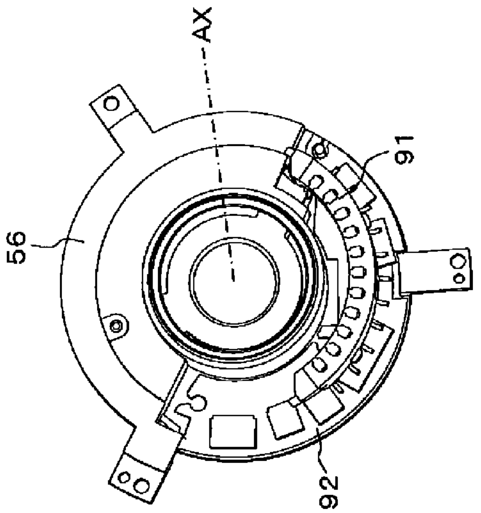
FIG. 18B is an oblique perspective view of a fourth lens support frame 56, a lens-side contact unit 91, and an electrical board 92.

The lens-side contact unit 91 (one example of an electrical contact) is fixed to the lens housing 2*a*, and configured to be electrically connected to the camera body 3 (one example of an external device) via the body mount 4. As shown in FIGS. 18A and 18B, in this embodiment, the lens-side contact unit 91 is fixed to the lens mount 95. The lens-side contact unit 91 extends in an arc shape around the optical axis AX. The lens-side contact unit 91 has a plurality of contacts disposed in an arc shape. The lens-side contact unit 91 is electrically connected to the electrical board 92.

2-3 Electrical Board 92

Figure 18C:
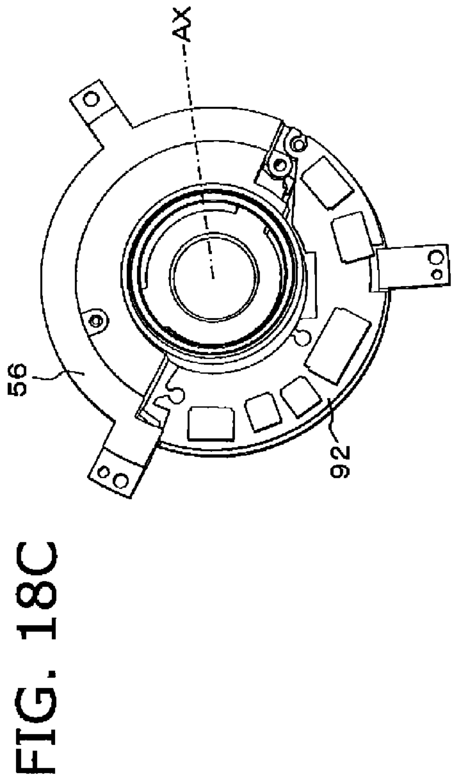
FIG. 18C is an oblique perspective view of the fourth lens support frame 56 and the electrical board 92.
Figure 18D:
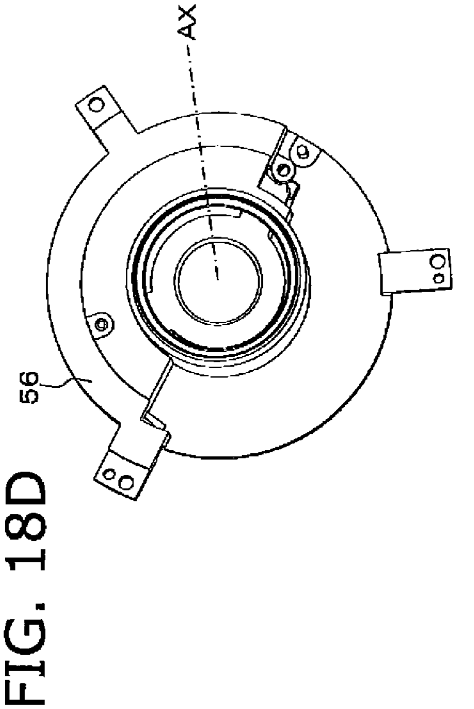
FIG. 18D is an oblique perspective view of the fourth lens support frame 56.
Figure 19:
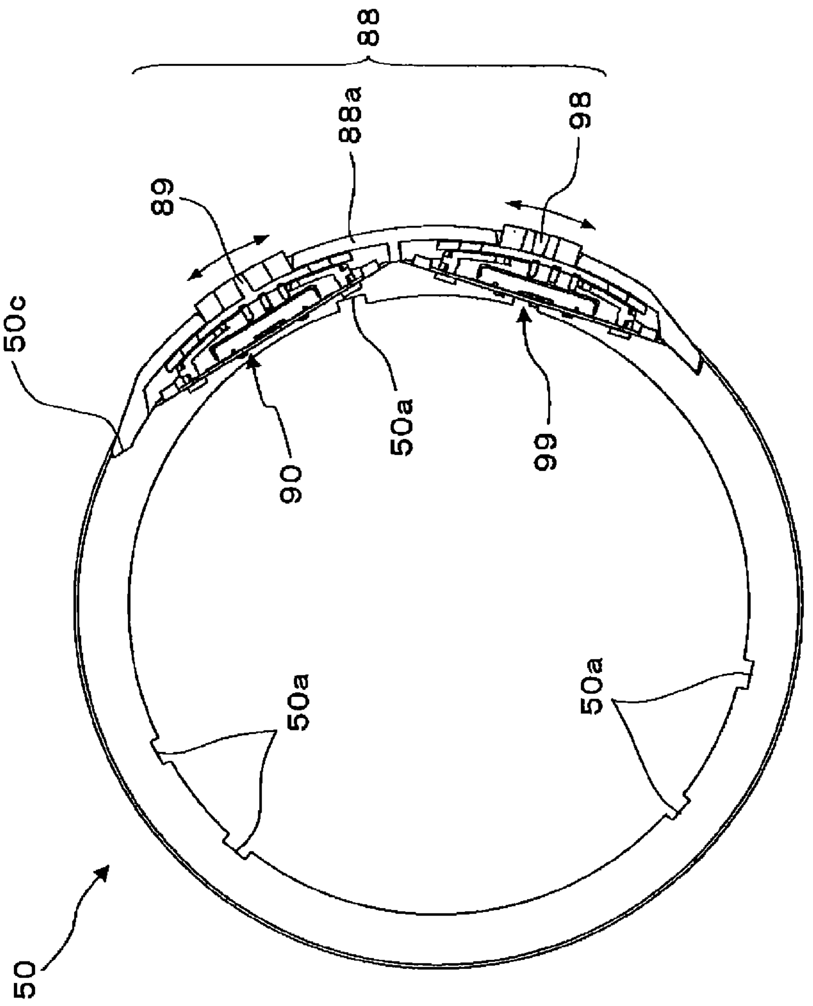
FIG. 19 is a plan view of an interface lever unit 88.

The electrical board 92 (one example of an electrical board) is fixed to the lens housing 2*a*, and is electrically connected to the lens-side contact unit 91. In this embodiment, as shown in FIGS. 18B and 18C, the electrical board 92 is fixed to the fourth lens support frame 56. The lens controller 40, a focus drive controller 41, and a correction controller 48 are mounted as electronic parts to the electrical board 92. As shown in FIGS. 6 and 12, the electrical board 92 is disposed on the inner peripheral side of the cam frame 80 when viewed in the optical axis direction. This allows the cam frame 80 to be closer to the base member 93, and makes it possible to reduce the size of the interchangeable lens unit 2.

2-4 Cam Frame 80

The cam frame 80 is rotatably supported by the lens housing 2*a*. More precisely, the cam frame 80 is supported rotatably around the optical axis AX by the fixed frame 50, and moves in the optical axis direction while rotating around the inner peripheral side of the fixed frame 50, or rotates without moving in the optical axis direction on the inner peripheral side of the fixed frame 50. The cam frame 80 is rotationally driven by a zoom drive unit 45.

The cam frame 80 has a substantially cylindrical main body 81, the three guide cam followers 83, and a gear component 82. The three guide cam followers 83 are inserted into the three guide cam grooves 50*b* of the fixed frame 50, and protrude outside from the outer peripheral face of the main body 81. When the cam frame 80 rotates with respect to the fixed frame 50, the guide cam followers 83 are guided by the guide cam grooves 50*b*. As a result, the cam frame 80 moves in the optical axis direction while rotating with respect to the fixed frame 50, or rotates with respect to the fixed frame 50 without moving in the optical axis direction. In this embodiment, when not in use (stowed state), the cam frame 80 moves more to the image plane side than the region of movement in the optical axis direction with respect to the lens housing 2*a*. That is, when in use (see FIG. 6B), the cam frame 80 is deployed to the subject side with respect to the fixed frame 50, but when not in use (see FIG. 6A), the cam frame 80 moves to the image plane side with respect to the fixed frame 50, and is stowed inside the fixed frame 50.

The gear component 82 is disposed on the inner peripheral face of the main body 81, and protrudes inside from the inner peripheral face of the main body 81. The gear component 82 meshes with a first transmission gear 85 (discussed below) of the zoom drive unit 45. Drive force from the zoom drive unit 45 (more precisely, the transmission mechanism 84) is transmitted to the gear component 82.

The gear component 82 is disposed substantially in the middle of the main body 81 in the optical axis direction. In a state in which the cam frame 80 has moved closest to the base member 93, a stowage space S (one example of a stowage space) is formed between the gear component 82 and the base member 93 (see FIGS. 6A and 7A, for example).

The zoom drive unit 45 (the zoom motor 87 and the transmission mechanism 84) is disposed on the inner peripheral side of the main body 81. The zoom motor 87 and/or the transmission mechanism 84 is disposed more to the image plane side than the gear component 82. In a state in which the cam frame 80 is closest to the base member 93, the zoom motor 87 and the transmission mechanism 84 are inside the stowage space S (see FIG. 6A, for example).

The two ends of the gear component 82 are at different positions in the optical axis direction. More specifically, as shown in FIG. 8A, the gear component 82 has a first gear component 82*a* and a second gear component 82*b*. The first gear component 82*a* extends along the inner peripheral face of the main body 81, and is used when the cam frame 80 rotates without moving in the optical axis direction with respect to the fixed frame 50. Meanwhile, the second gear component 82*b* is inclined with respect to the circumferential direction, and is disposed so as to gradually approach the base member 93 from the first gear component 82*a*. The second gear component 82*b* is used when the cam frame 80 moves in the optical axis direction while rotating with respect to the fixed frame 50.

As shown in FIG. 8A, the cam frame 80 has three inner peripheral cam grooves 83*a* (one example of a first cam groove, second cam groove, and third cam groove) and three outer peripheral cam grooves 83*b* (one example of outer peripheral cam grooves).

The inner peripheral cam grooves 83*a* are provided to guide the second lens support frame 69 in the optical axis direction, and are disposed on the inner peripheral face of the main body 81. Three cam followers 53*e*, 53*f*, and 53*g* of the moving frame 53 are inserted into the three guide cam followers 83, respectively. The gear component 82 is disposed so as to avoid the inner peripheral cam grooves 83*a*. The second gear component 82*b* of the gear component 82 is close to the inclined portion of the inner peripheral cam grooves 83*a*, and is disposed substantially along this inclined portion. Part of the inner peripheral cam grooves 83*a* (one example of first cam grooves) is disposed on the image plane side (base member 93 side) of the gear component 82 (more precisely, the first gear component 82*a*).

The outer peripheral cam grooves 83*b* are provided to guide the first lens support frame 51 in the optical axis direction, and are disposed on the outer peripheral face of the main body 81. Three inner peripheral cam followers 51*d* (discussed below) of the first lens support frame 51 are inserted into the three outer peripheral cam grooves 83*b*, respectively.

Figure 9:
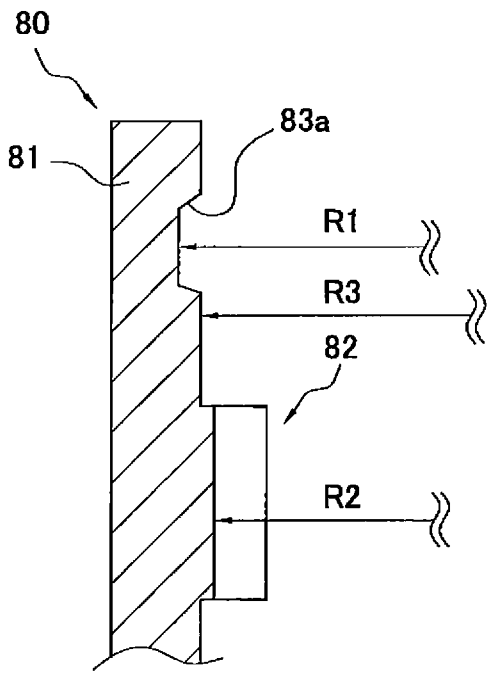
FIG. 9 is a cross section along the IX-IX line in FIG. 8B.

The dimensions of the gear component 82 in the radial direction will now be described. As shown in FIG. 9, the gear component 82 protrudes inward in the radial direction from the inner peripheral face of the main body 81. Accordingly, the inside diameter R1 of the bottom face of the inner peripheral cam grooves 83*a* is greater than the core diameter R2 of the gear component 82. Also, the core diameter R2 of the gear component 82 is less than the inside diameter R3 of the main body 81. Therefore, even if the gear component 82 and the inner peripheral cam grooves 83*a* overlap, for example, this prevents the function of the inner peripheral cam grooves 83*a* from being lost at the overlapping portions. Also, even if the outer peripheral cam grooves 83*b* pass through the outer peripheral side of the gear component 82, a decrease in the strength of the cam frame 80 can be suppressed.

(2-5) Zoom Drive Unit 45

The zoom drive unit 45 (one example of a drive actuator) is provided to adjust the focal distance of the optical system O. The zoom drive unit 45 is mounted to the lens housing 2*a* (more precisely, the fourth lens support frame 56), and rotationally drives the cam frame 80 with respect to the lens housing 2*a*. The zoom drive unit 45 has the zoom motor 87 and the transmission mechanism 84.

The zoom motor 87 is a DC motor, for example, and has a zoom driveshaft 87*a* (one example of a driveshaft) that outputs drive force. The zoom motor 87 may instead be another kind of motor, such as a stepping motor.

Figure 12A:
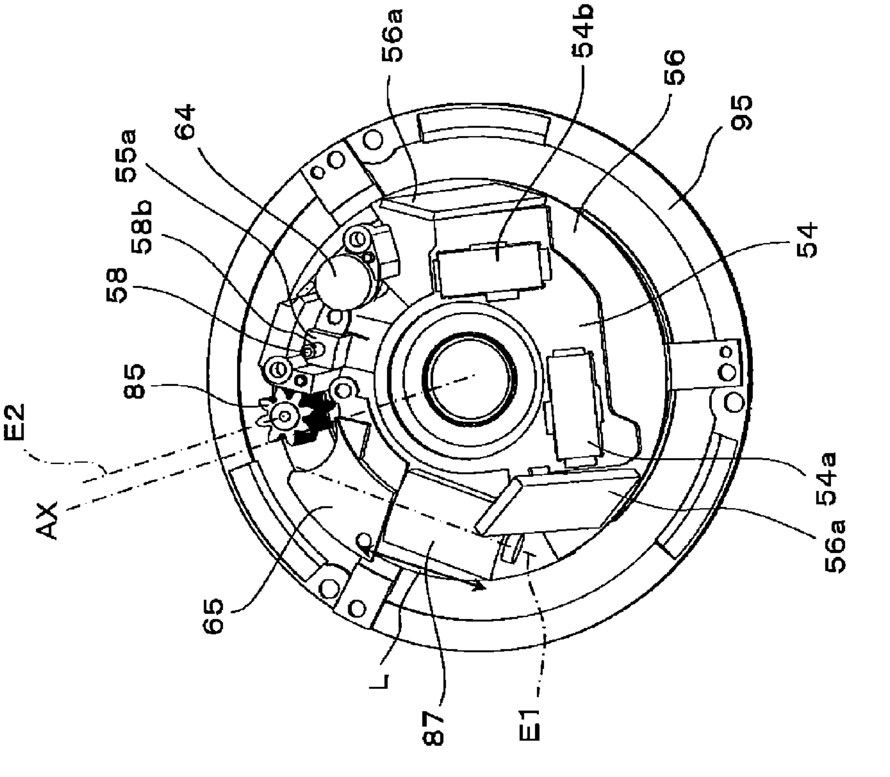
FIG. 12A is an oblique perspective view of the interchangeable lens unit 2, which is similar to FIG. 11B except that the cam frame 80 and a moving frame 53 have been removed.
Figure 12B:
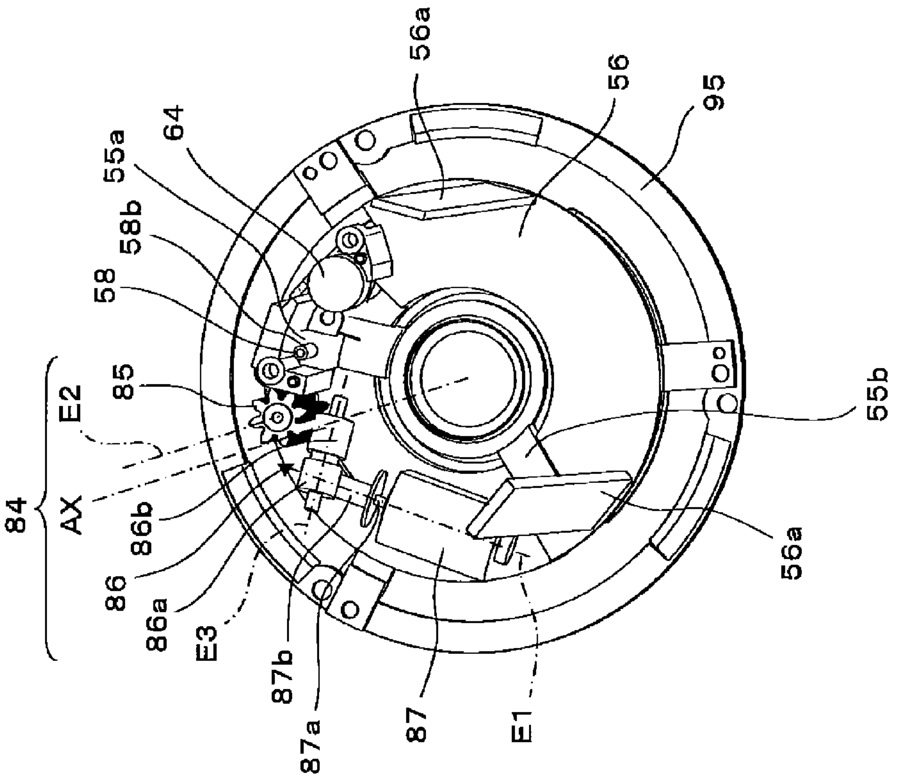
FIG. 12B is an oblique perspective view of the interchangeable lens unit 2, which is similar to FIG. 12A except that when a correction lens frame 54 and a second support cover 65 have been removed.

The zoom motor 87 is mounted to the lens housing 2*a* (more precisely, the fourth lens support frame 56). The lengthwise direction L of the zoom motor 87 is different from the optical axis direction, as shown in FIG. 12A. The "lengthwise direction L of the zoom motor 87" means a direction parallel to the longest side of an imaginary cuboid defined as being the smallest imaginary cuboid in which the zoom motor 87 will fit. Since the zoom motor 87 has a slender zoom driveshaft 87*a*, the lengthwise direction L of the zoom motor 87 is parallel to the rotational axis E1 of the zoom driveshaft 87*a*. Since the lengthwise direction L of the zoom motor 87 is parallel to the rotational axis E1, the rotational axis E1 of the zoom driveshaft 87*a* is different from the optical axis direction, just as the lengthwise direction L is. In this embodiment, as shown in FIG. 12B, the lengthwise direction L and the rotational axis E1 of the zoom driveshaft 87*a* are disposed substantially parallel to a plane that is perpendicular to the optical axis direction.

The transmission mechanism 84 (one example of a transmission mechanism) transmits drive force from the zoom driveshaft 87*a* to the cam frame 80. The transmission mechanism 84 is mounted to the fourth lens support frame 56.

The transmission mechanism 84 reduces the rotational speed of the zoom driveshaft 87*a* and transmits this rotation to the gear component 82 of the cam frame 80. More specifically, as shown in FIG. 12B, the transmission mechanism 84 has a first transmission gear 85 (one example of a first transmission gear member, and one example of a drive gear member) that meshes with the gear component 82, and a second transmission gear 86 (one example of a second transmission gear member) that meshes with the first transmission gear 85 and transmits drive force from the zoom driveshaft 87*a* to the first transmission gear 85.

The first transmission gear 85 is rotatably supported by the fourth lens support frame 56 and a first support cover 57. The rotational axis E2 of the first transmission gear 85 is parallel to the optical axis direction, but the rotational axis E3 of the second transmission gear 86 faces in a different direction from the optical axis direction. In this embodiment, the rotational axis E3 of the second transmission gear 86 is inclined with respect to a plane that is perpendicular to the optical axis direction.

The zoom driveshaft 87*a* has an output gear 87*b* (one example of an output gear) that outputs drive force. The second transmission gear 86 has a first intermediate gear 86*a* that meshes with the output gear 87*b*, and a second intermediate gear 86*b* that meshes with the first transmission gear 85 and includes a worm gear. The first intermediate gear 86*a* is a spur gear, for example. As shown in FIG. 12A, a second support cover 65 is fixed to the fourth lens support frame 56. The second transmission gear 86 is covered by the second support cover 65. The second transmission gear 86 is rotatably supported by the fourth lens support frame 56 and the second support cover 65.

Figure 14:
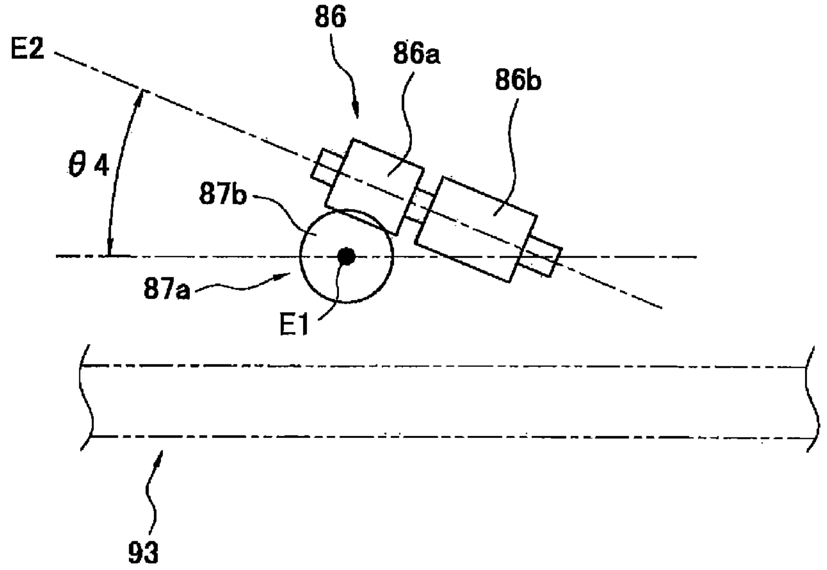
FIG. 14 shows the layout of a zoom driveshaft 87*a* and a second transmission gear 86.

As shown in FIG. 14, the rotational axis E3 of the second transmission gear 86 is inclined by substantially the same angle θ4 as the lead angle of the second intermediate gear 86*b*, with respect to a plane that is perpendicular to the optical axis direction. FIG. 14 shows the positional relation between the output gear 87*b* and the second transmission gear 86 when viewed in a direction parallel to the rotational axis E1 of the zoom driveshaft 87*a*. The output gear 87*b* is disposed between the second transmission gear 86 and the first intermediate gear 86*a*. The second intermediate gear 86*b* is disposed closer to the base member 93 than the first intermediate gear 86*a*.

Figure 15:
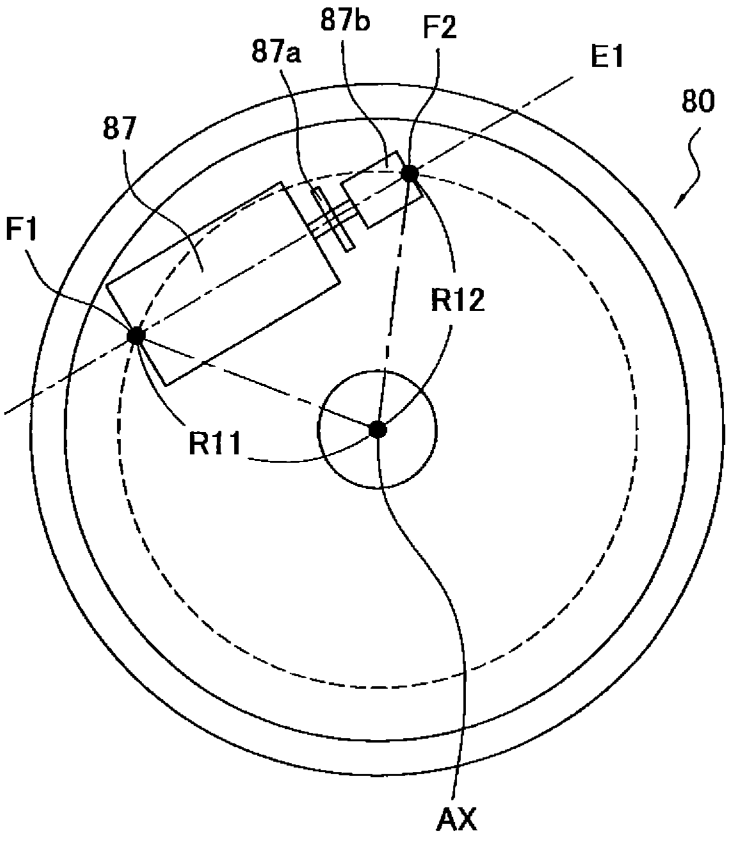
FIG. 15 shows the layout of the cam frame 80 and a zoom motor 87.

As shown in FIG. 15, the rotational axis E1 of the zoom driveshaft 87*a* is disposed substantially along the circumferential direction of the cam frame 80. Here, the phrase "the rotational axis E1 of the zoom driveshaft 87*a* is disposed substantially along the circumferential direction of the cam frame 80" means that, for example, in FIG. 15, the distances R11 and R12 from the points F1 and F2 where the ends of the zoom motor 87 intersect with the rotational axis E1 to the optical axis AX are substantially the same. This allows the zoom motor 87 to be efficiently disposed along the inner peripheral face of the cam frame 80.

2-6 First Lens Support Frame 51

The first lens group G1 is fixed to the first lens support frame 51. The first lens support frame 51 is supported movably in the optical axis direction by the fixed frame 50 of the lens housing 2*a*, and its rotation is restricted by the fixed frame 50. When the cam frame 80 rotates with respect to the fixed frame 50, the first lens support frame 51 is driven in the optical axis direction by the cam frame 80.

As shown in FIG. 5 and FIGS. 6A to 7C, the first lens support frame 51 has three rectilinear protrusions 51*b* and three inner peripheral cam followers 51*d*. The three rectilinear protrusions 51*b* are inserted into the three rectilinear grooves 50*a*, respectively.

The three inner peripheral cam followers 51*d* are inserted into the outer peripheral cam grooves 83*b*, respectively. Since the rectilinear protrusions 51*b* are guided in the optical axis direction by the rectilinear grooves 50*a*, the first lens support frame 51 is able to move in the optical axis direction without rotating with respect to the fixed frame 50. Also, when the cam frame 80 rotates with respect to the fixed frame 50, the inner peripheral cam followers 51*d* are guided by the guide cam followers 83, so the first lens support frame 51 moves in the optical axis direction with respect to the fixed frame 50 according to the shape of the outer peripheral cam grooves 83*b*.

Also, a threaded component 51*e* is formed on the front face of the first lens support frame 51. An optical filter, such as a polarizing filter or a protective filter, or a conversion lens can be attached to the threaded component 51*e*.

(2-7) Second Lens Support Frame 69

The second lens support frame 69 (FIG. 16A) supports the second lens group G2 and is guided by the cam frame 80 in the optical axis direction with respect to the lens housing 2*a*. More specifically, as shown in FIG. 5, the second lens support frame 69 has a front lens frame 52, the aperture unit 62, the moving frame 53, a correction lens frame 54, and a correction drive unit 46. The front lens frame 52, the aperture unit 62, the moving frame 53, the correction lens frame 54, and the correction drive unit 46 are disposed movably and integrally in the optical axis direction.

The fourth lens L4 is fixed to the front lens frame 52. The front lens frame 52 is fixed to the moving frame 53 by screws, for example. The fifth lens L5 and the sixth lens L6 are fixed by adhesive, for example, to the moving frame 53. When the fifth lens L5 and the sixth lens L6 are fixed to the moving frame 53, the positions of the fifth lens L5 and the sixth lens L6 with respect to the fourth lens L4 are adjusted so that the optical axis center of the fifth lens L5 and the sixth lens L6 and the optical axis center of the fourth lens L4 will be disposed coaxially. After position adjustment, three adhesive reservoirs 53*i* (see FIGS. 16A and 16C) provided to the moving frame 53 are coated with an adhesive agent and the adhesive is cured, which fixes the fifth lens L5 and the sixth lens L6 to the moving frame 53. How the front lens frame 52 is fixed is not limited to the above method, and adhesive bonding or other fixing methods may also be used. Also, how the fifth lens L5 and the sixth lens L6 are fixed is not limited to the above method, and some other fixing method may be used instead.

The aperture unit 62 is disposed movably in the optical axis direction with respect to the lens housing 2*a*, and adjusts the amount of light. The aperture unit 62 has a plurality of aperture vanes 62*c* that can vary the optical path diameter, an aperture support frame 62*b* that supports the aperture vanes 62*c*, and an aperture drive motor 62*a* that adjusts the amount of light by driving the plurality of aperture vanes 62*c*. The aperture drive motor 62*a* is fixed to the aperture support frame 62*b*, and protrudes on the subject side from the aperture support frame 62*b*. The aperture unit 62 is disposed between the moving frame 53 and the front lens frame 52.

Figure 16C:
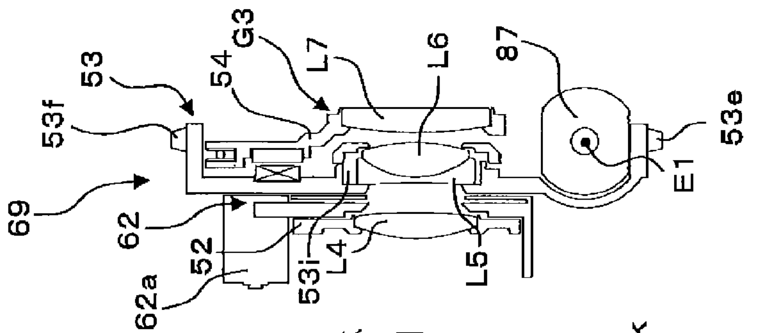
FIG. 16C is a simplified cross section of the second lens support frame 69.
Figure 16B:
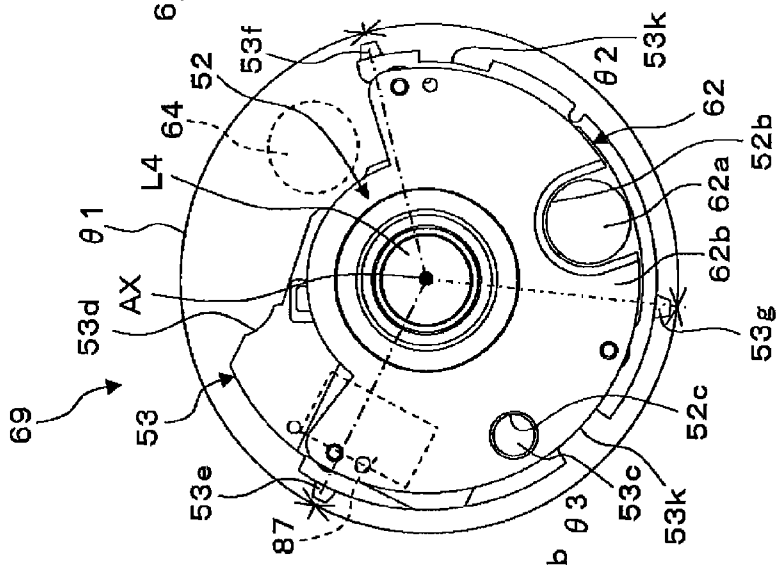
FIG. 16B is a plan view (front face side) of the second lens support frame 69.
Figure 16A:
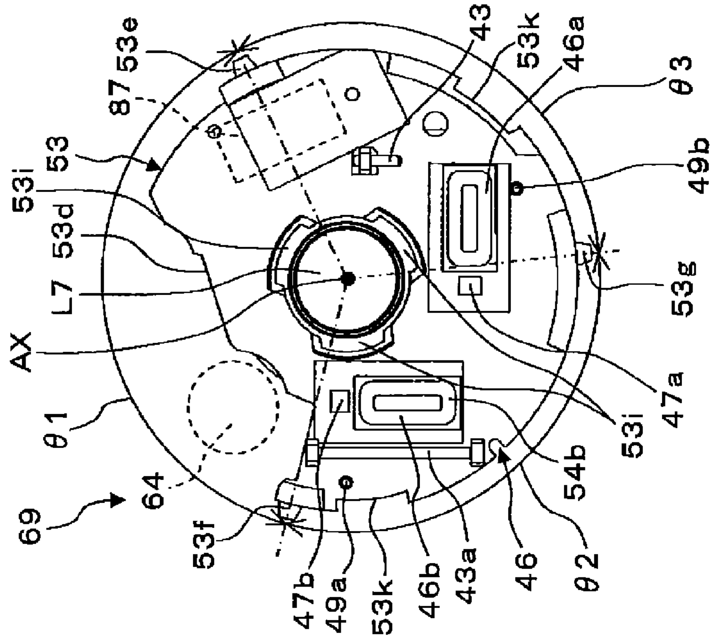
FIG. 16A is a plan view (rear face side) of a second lens support frame 69.
Figure 17A:
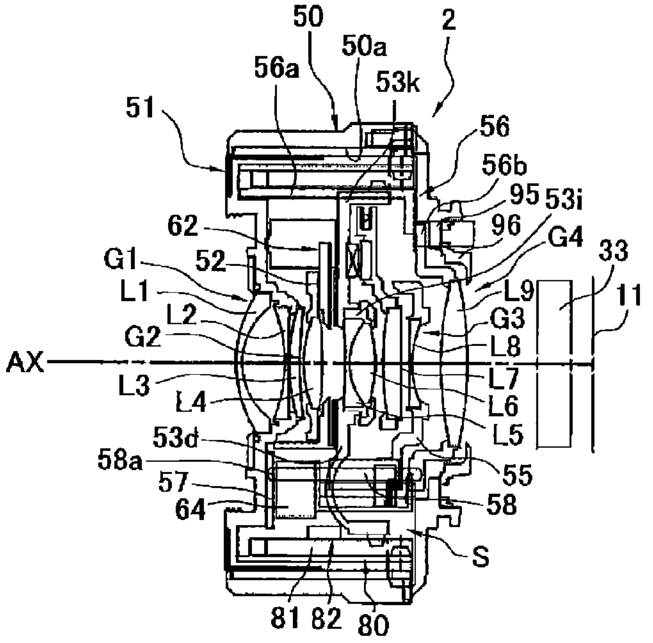
FIG. 17A is a simplified cross section of the interchangeable lens unit 2 in its stowed state.
Figure 17B:
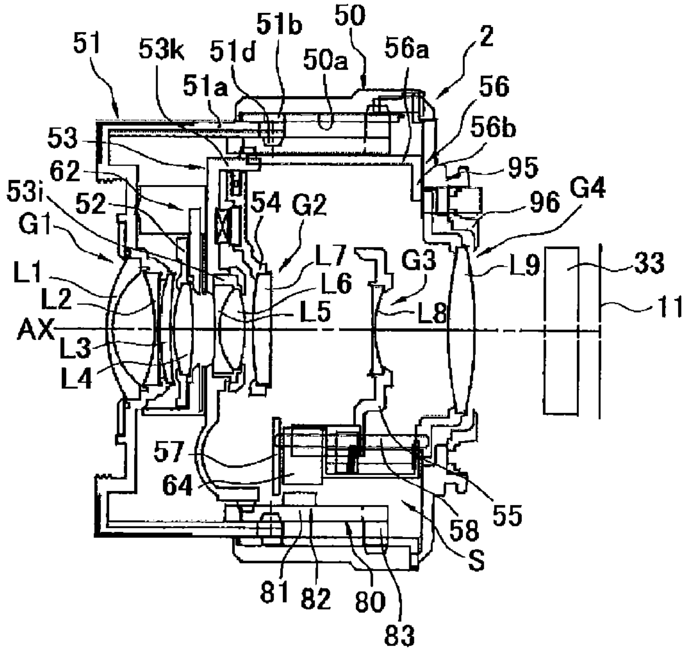
FIG. 17B is a simplified cross section of the interchangeable lens unit 2 at the telephoto end.

The fifth lens L5 and the sixth lens L6 are fixed to the moving frame 53. The moving frame 53 is guided by the cam frame 80 in the optical axis direction with respect to the lens housing 2*a*. More specifically, as shown in FIGS. 16A to 16C, the moving frame 53 has a moving frame main body 53*a*, the three cam followers 53*e*, 53*f*, and 53*g*, a holder 53*c*, and the two rectilinear guide grooves 53*k*. The moving frame main body 53*a* is a substantially annular member, but one part is cut away on the outer peripheral side. The three cam followers 53*e*, 53*f*, and 53*g* protrude outward from the outer peripheral part of the moving frame main body 53*a*, and are inserted into the three inner peripheral cam grooves 83*a* of the cam frame 80.

The two rectilinear guide grooves 53*k* extend in the optical axis direction, and are disposed spaced apart in the circumferential direction. The rectilinear guide plates 56*a* of the fourth lens support frame 56 are inserted into the rectilinear guide grooves 53*k*. This allows the moving frame 53 to move in the optical axis direction without rotating with respect to the lens housing 2*a*.

The holder 53*c* is a cylinder that is closed at one end, and protrudes on the subject side from the moving frame main body 53*a*. The end 59*a* of a focusing sub-shaft 59 is configured to be inserted in the optical axis direction into the holder 53*c*. When the moving frame main body 53*a* approaches the third lens support frame 55, the end of the focusing sub-shaft 59 is inserted into the holder 53*c*. This prevents the moving frame 53 from interfering with the focusing sub-shaft 59, and ensures a large enough range of motion for both the third lens support frame 55 and the moving frame 53.

As shown in FIG. 16A, the correction lens frame 54 is disposed on the image plane side of the moving frame 53, and is supported movably along a plane that is perpendicular to the optical axis direction by the moving frame 53. The seventh lens L7 is fixed to the correction lens frame 54.

A rotational support shaft 49*a*, a first slide pole 43*a*, and a second slide pole 43*b* are fixed to the moving frame 53. The correction lens frame 54 is supported movably in the pitch direction with respect to the moving frame 53 by the first slide pole 43*a* and the second slide pole 43*b*. Also, movement of the correction lens frame 54 in the optical axis direction with respect to the moving frame 53 is restricted by the first slide pole 43*a* and the second slide pole 43*b*. Further, the correction lens frame 54 is guided movably in the yaw direction by the rotational support shaft 49*a*, and rotates around the rotational support shaft 49*a*. This allows the seventh lens L7 to be moved along a plane that is perpendicular to the optical axis AX.

As shown in FIG. 16A, a restricting shaft 49*b* is fixed to the moving frame 53. The correction lens frame 54 has a restricted part 54*c* having a hole 54*d*. The restricting shaft 49*b* is inserted into the hole 54*d* of the restricted part 54*c* and restricts the movement of the correction lens frame 54 with respect to the moving frame 53 to a specific range.

The method for assembling the correction lens frame 54 will now be described. First, the rotational support shaft 49*a*, the first slide pole 43*a*, and the second slide pole 43*b* are fixed to the moving frame 53. Three support grooves (not shown) are formed in the correction lens frame 54. The correction lens frame 54 is attached to the moving frame 53 so that the first slide pole 43*a* will fit into two of the support grooves, and the second slide pole 43*b* will fit into the remaining support groove. At this point, the rotational support shaft 49*a* is fitted into a rotational support groove (not shown) of the correction lens frame 54. As a result, the correction lens frame 54 is supported by the moving frame 53 movably in a plane that is perpendicular to the optical axis direction. At this point movement of the correction lens frame 54 in the optical axis direction is restricted with respect to the moving frame 53.

Next, the restricting shaft 49*b* is fixed by press-fitting, for example, to the moving frame 53. The restricting shaft 49*b* is press-fitted into the hole 54*d* in the restricted part 54*c* of the correction lens frame 54, and is disposed at a position that does not overlap the aperture unit 62 when viewed in the optical axis direction. Therefore, when the restricting shaft 49*b* is press-fitted to the moving frame 53, the face of the moving frame 53 on the opposite side from the restricting shaft 49*b* (the subject side) can be directly received by a jig, allowing the work of press-fitting the restricting shaft 49*b* to be carried out easily.

The correction lens frame 54 is attached to the moving frame 53 in this manner.

The correction lens frame 54 is driven in two directions along a plane that is perpendicular to the optical axis direction, by the correction drive unit 46. The correction drive unit 46 has a first magnet 54*a*, a second magnet 54*b*, a first yoke 44*a*, a second yoke 44*b*, a first coil 46*a*, and a second coil 46*b*. As shown in FIG. 12A, the first magnet 54*a* and the second magnet 54*b* are fixed on the subject side of the correction lens frame 54. The first yoke 44*a* is attached to the face of the first magnet 54*a* on the opposite side from the first coil 46*a* (the subject side). The second yoke 44*b* is attached to the face of the second magnet 54*b* on the opposite side from the second coil 46*b* (the subject side). Meanwhile, the first coil 46*a* and the second coil 46*b* are fixed on the image plane side of the moving frame 53. The first magnet 54*a*, the first yoke 44*a*, and the first coil 46*a* constitute an electromagnetic actuator. Also, the second magnet 54*b*, the second yoke 44*b*, and the second coil 46*b* constitute an electromagnetic actuator. The electromagnetic force of these electromagnetic actuators drives the correction lens frame 54 along a plane that is perpendicular to the optical axis AX.

The configuration of the moving frame 53 will now be described in further detail.

As shown in FIGS. 16A to 16C, when the second lens support frame 69 is closest to the base member 93, the zoom motor 87 is housed inside the moving frame 53 as shown in FIG. 16C, for example. At this point, the cam follower 53*e* (one example of a first cam follower) is disposed on the outer peripheral side of the zoom motor 87 when viewed in the optical axis direction.

The focus motor 64, the first transmission gear 85, and a focusing main shaft 58 are disposed in the circumferential direction between the cam follower 53*e* and the cam follower 53*f*. A cut-out 53*d* is formed in the circumferential direction between the two cam followers 53*e* and 53*f*. The focus motor 64 is disposed in the circumferential direction between the cam follower 53*e* and the cam follower 53*f* when viewed in the optical axis direction. The focus motor 64, the first transmission gear 85, and the focusing main shaft 58 are disposed within the cut-out 53*d*.

Because the focus motor 64, the first transmission gear 85, and the focusing main shaft 58 are disposed within the cut-out 53*d*, a relatively large spacing is ensured in the circumferential direction between the cam follower 53*e* and the cam follower 53*f*. More specifically, as shown in FIGS. 16A and 16B, the central angle θ1 between the cam follower 53*e* and the cam follower 53*f* is greater than the central angle θ2 between the cam follower 53*f* and the cam follower 53*g*, and is greater than the central angle θ3 between the cam follower 53*g* and the cam follower 53*e*. That is, the central angle θ1 is greater than 120 degrees. The central angle θ1 may be set to 120 degrees or more. In this embodiment, the central angle θ2 is the same as the central angle θ3.

Figure 7A:
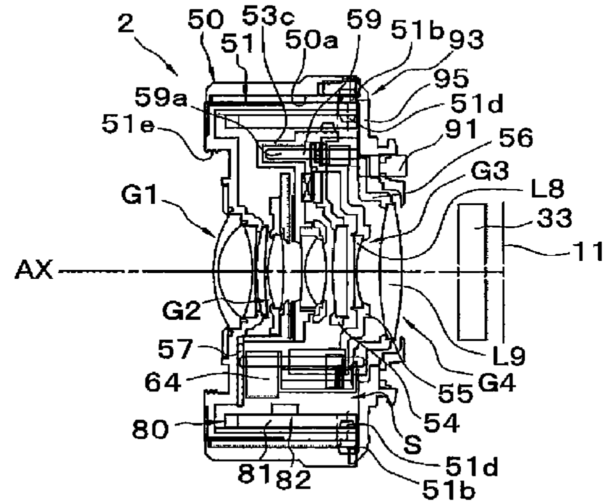
FIG. 7A is a simplified cross section of the interchangeable lens unit 2 in its stowed state.
Figure 7B:
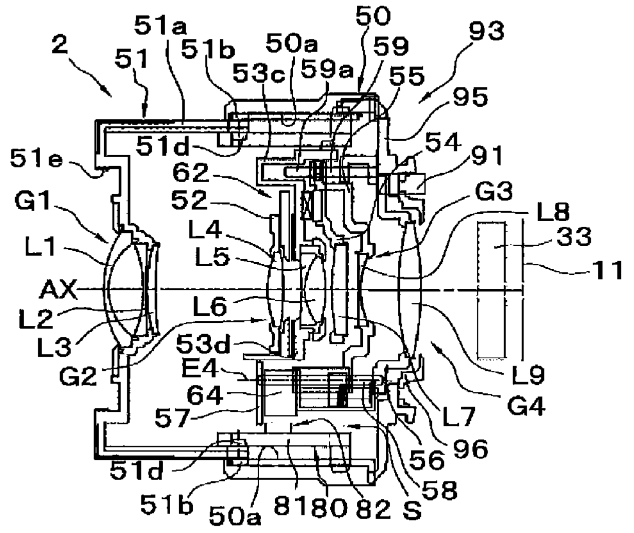
FIG. 7B is a simplified cross section of the interchangeable lens unit 2 at the wide angle end.
Figure 7C:
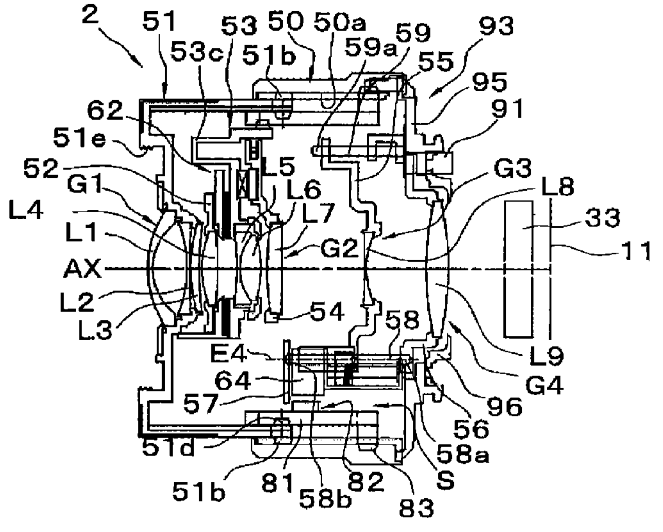
FIG. 7C is a simplified cross section of the interchangeable lens unit 2 at the telephoto end.

Also, since the cut-out 53*d* is formed relatively large in the circumferential direction, the gear component 82 can move into the cut-out 53*d*. More specifically, as shown in FIGS. 7A to 7C, the gear component 82 of the cam frame 80 moves into the cut-out 53*d* in the course of the moving frame 53 being guided in the optical axis direction by the cam frame 80. Because the cut-out 53*d* is provided, the gear component 82 does not hinder the movement of the second lens support frame 69, so the interchangeable lens unit 2 can be made thinner.

Figure 6A:
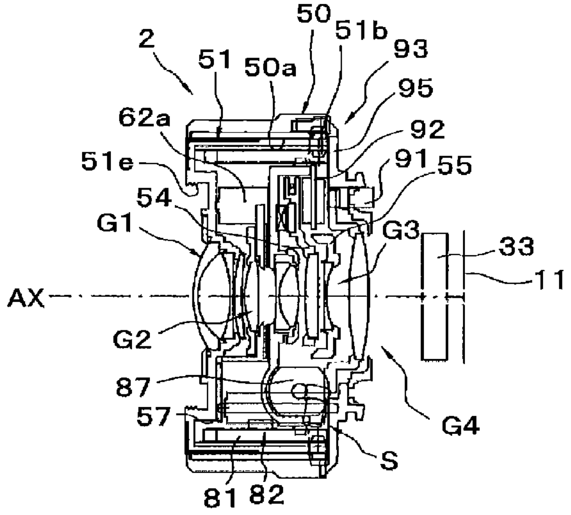
FIG. 6A is a simplified cross section of the interchangeable lens unit 2 in its stowed state.

As shown in FIG. 6A, in the stowed state of the interchangeable lens unit 2, part of the outer peripheral part of the moving frame 53 goes into the stowage space S formed between the gear component 82 and the base member 93. Consequently, the stowage space S on the image plane side of the gear component 82 can be effectively utilized, and the interchangeable lens unit 2 can be made even more compact.

(2-8) Third Lens Support Frame 55

The third lens group G3 (eighth lens L8) is fixed to the third lens support frame 55. The third lens support frame 55 is disposed movably in the optical axis direction with respect to the lens housing 2*a*. The third lens support frame 55 is supported movably in the optical axis direction by the lens housing 2*a*. More specifically, the third lens support frame 55 has a bearing component 55*a*, a rotation restricting arm 55*b*, and a rack 55*c*.

The bearing component 55*a* extends in the optical axis direction and has a sliding hole. The focusing main shaft 58 is inserted into this sliding hole. A first end 58*a* of the focusing main shaft 58 is fixed to the fourth lens support frame 56. A second end 58*b* of the focusing main shaft 58 is fixed to the first support cover 57, which is fixed to the fourth lens support frame 56. Therefore, the third lens support frame 55 is guided in the optical axis direction by the focusing main shaft 58.

The focusing sub-shaft 59 is fixed to the fourth lens support frame 56. The focusing sub-shaft 59 is inserted into a restricting hole 55*d* in the rotation restricting arm 55*b* of the third lens support frame 55. The focusing sub-shaft 59 restricts rotation of the third lens support frame 55 around the focusing main shaft 58 with respect to the lens housing 2*a*.

The rack 55*c* meshes with a lead screw of a focus driveshaft 64*a* of the focus motor 64. When the focus driveshaft 64*a* rotates, the rack 55*c* is guided in the optical axis direction by the lead screw, and the third lens support frame 55 moves in the optical axis direction with respect to the fourth lens support frame 56.

(2-9) Focus Motor 64

The focus motor 64 has the focus driveshaft 64*a* (one example of a rotating shaft) that outputs a drive force, and drives the third lens support frame 55 in the optical axis direction. The rotational axis E4 of the focus driveshaft 64*a* is substantially parallel to the optical axis direction. The focus driveshaft 64*a* has a lead screw that meshes with the rack 55*c* of the third lens support frame 55. When the focus driveshaft 64*a* rotates, the rack 55*c* is driven in the optical axis direction by the lead screw. This is how the third lens support frame 55 is driven in the optical axis direction.

The first transmission gear 85 is rotatably supported by the first support cover 57 and the fourth lens support frame 56. Also, the zoom motor 87, the focusing main shaft 58, the bearing component 55*a*, and the focus motor 64 are housed inside the first support cover 57. The first support cover 57 has a shape that is complementary with the cut-out 53*d* in the moving frame 53, and when the second lens support frame 69 moves toward the base member 93, the first support cover 57 goes into the cut-out 53*d*.

(2-10) Interface Lever Unit 88

The interface lever unit 88 has a zoom lever 89, a support base 88*a*, a zoom lever detector 90 (see FIG. 1), a focus lever 98, and a focus lever detector 99.

The zoom lever 89 is provided to adjust the focal distance of the optical system O, and is disposed on the outer peripheral part of the fixed frame 50. The zoom lever 89 is provided rotatably in the circumferential direction with respect to the lens housing 2*a*. More specifically, the zoom lever 89 is supported movably in the circumferential direction by the fixed frame 50 via the support base 88*a*. The zoom lever 89 is able to move in two directions: toward the wide angle side and toward the telephoto side.

The focus lever 98 is provided to adjust the imaging distance from the digital camera 1 to the main subject in focus (also called the subject distance), and is disposed on the outer peripheral part of the fixed frame 50. The focus lever 98 is provided rotatably in the circumferential direction with respect to the lens housing 2*a*. More specifically, the focus lever 98 is supported movably in the circumferential direction by the fixed frame 50 via the support base 88*a*. The focus lever 98 is able to move in two directions: toward the close-up side and toward the infinity side.

The support base 88*a* movably supports the zoom lever 89 and the focus lever 98, and is fixed to the outer peripheral part of the fixed frame 50. More precisely, the support base 88*a* is fitted into the concave component 50*c* of the fixed frame 50. Part of the support base 88*a* goes into the inside from the outer peripheral edge of the fixed frame 50. Accordingly, part of the zoom lever 89 and part of the focus lever 98 also go into the inside from the outer peripheral edge of the fixed frame 50. Thus, the thickness of the fixed frame 50 is effectively utilized as a space for installing the interface lever unit 88 and the focus lever 98.

The zoom lever detector 90 is provided to detect the position of the zoom lever 89, and is electrically connected to the lens controller 40. The lens controller 40 recognizes the direction in which the zoom lever 89 is operated on the basis of the detection result of the zoom lever detector 90.

The focus lever detector 99 is provided to detect the position of the focus lever 98, and is electrically connected to the lens controller 40. The lens controller 40 identifies the direction in which the focus lever 98 is operated on the basis of the detection result of the focus lever detector 99.

The layout of the interface lever unit 88 will now be described in greater detail. As shown in FIG. 8A, the zoom lever 89 and the focus lever 98 are disposed at positions that do not overlap the three guide cam grooves 50*b*. More precisely, the zoom lever 89 and the focus lever 98 are disposed at positions that are farther from the base member 93 in the optical axis direction than the three guide cam grooves 50*b*. In other words, the zoom lever 89 and the focus lever 98 are disposed more toward the subject side than the three guide cam grooves 50*b* in the optical axis direction.

(3) Aperture Adjustment Unit 73

As shown in FIG. 1, the aperture adjustment unit 73 has the above-mentioned aperture unit 62 and an aperture drive controller 42 that controls the aperture drive motor 62*a* of the aperture unit 62. The aperture drive motor 62*a* is a stepping motor, for example. The aperture drive controller 42 sends drive pulses to the aperture drive motor 62*a* on the basis of a command from the lens controller 40. This allows the aperture value of the optical system O to be adjusted to the desired value.

(4) Focus Adjusting Unit 72

As shown in FIG. 1, the focus adjusting unit 72 has the focus motor 64, the focus drive controller 41, and a photosensor 67. As discussed above, the focus motor 64 is fixed to the fourth lens support frame 56, and drives the third lens support frame 55 in the optical axis direction. In this embodiment, the focus motor 64 is a stepping motor.

The focus drive controller 41 sends drive pulses to the focus motor 64 on the basis of a command from the lens controller 40. The photosensor 67 detects whether or not the third lens support frame 55 is disposed at a specific position in the optical axis direction (the home position). The photosensor 67 is fixed to the fourth lens support frame 56, for example. This photosensor 67 has a light emitter (not shown) and a light receiver (not shown). When the detected part (not shown) of the third lens support frame 55 moves in between the light emitter and the light receiver, the photosensor 67 detects this part. The lens controller 40 is capable of detecting that the third lens support frame 55 is in the home position on the basis of the detection result of the photosensor 67, and detecting the presence of a focus home point detected part 52*f*. That is, the photosensor 67 is capable of detecting the home position of the fourth lens support frame 56, that is, a focus movable unit 94 with respect to the lens mount 95. The photosensor 67 may instead be some other kind of sensor, such as a combination of a magnet and a magnetic sensor.

(5) Blur Correction Unit 74

As shown in FIG. 1, the blur correction unit 74 is used to suppress blurring of the optical image with respect to the imaging sensor 11, which is attributable to movement of the digital camera 1. The blur correction unit 74 has the correction drive unit 46, a first position detection sensor 47*a*, a second position detection sensor 47*b*, and the correction controller 48.

As discussed above, the correction drive unit 46 drives the correction lens frame 54 along a plane that is perpendicular to the optical axis AX. More specifically, as shown in FIG. 16A, the correction drive unit 46 has the first magnet 54*a*, the second magnet 54*b*, the first coil 46*a*, and the second coil 46*b*. The first magnet 54*a* and the second magnet 54*b* are fixed to the correction lens frame 54. The first coil 46*a* and the second coil 46*b* are fixed to the moving frame 53. The first magnet 54*a* and the first coil 46*a* constitute an electromagnetic actuator, and drive the correction lens frame 54 in the pitch direction with respect to the moving frame 53 by electromagnetic force. The second magnet 54*b* and the second coil 46*b* constitute an electromagnetic actuator, and drive the correction lens frame 54 in the yaw direction with respect to the moving frame 53 by electromagnetic force.

As shown in FIGS. 1 and 16A, the first position detection sensor 47*a* detects the position of the correction lens frame 54 in the pitch direction with respect to the moving frame 53. The second position detection sensor 47*b* detects the position of the correction lens frame 54 in the yaw direction with respect to the moving frame 53. The first position detection sensor 47*a* and the second position detection sensor 47*b* are Hall elements, for example. The first position detection sensor 47*a* is disposed near the first magnet 54*a*. The second position detection sensor 47*b* is disposed near the second magnet 54*b*.

A movement detection sensor (not shown), such as a gyro sensor, is installed in the interchangeable lens unit 2. The correction controller 48 controls the correction drive unit 46 on the basis of the detection result of a position detection sensor 47 and the detection result of a movement detection sensor.

The method for suppressing blurring of the subject image may be electronic blur correction in which blurring that appears in an image is corrected on the basis of image data outputted from the imaging sensor 11. The method for suppressing blurring of the subject image may also be a sensor shift method in which the imaging sensor 11 is driven along a plane that is perpendicular to the optical axis AX.

(6) Lens Controller 40

As shown in FIG. 1, the lens controller 40 has a CPU (not shown), a ROM (not shown), and a memory 40*a*, and can carry out various functions by using the CPU to execute programs stored in the ROM. For instance, the lens controller 40 is capable of detecting that the third lens support frame 55 is in its home position on the basis of the detection result of the photosensor 67.

The memory 40*a* is a nonvolatile memory, and is capable of holding recorded information even when the power supply has been halted. Information related to the interchangeable lens unit 2, for example, is held in the memory 40*a*.

The lens controller 40 further has a counter 40*b*. The counter 40*b* counts the number of drive pulses of the focus motor 64. The lens controller 40 is capable of determining the position of the third lens group G3 in the optical axis direction by counting the number of drive pulses of the focus motor 64 from a state in which the third lens support frame 55 is in its home position.

Planar Positional Relations of Various Members

The planar positional relations of the constituent members of the interchangeable lens unit 2 will now be described in greater detail through reference to FIG. 20.

Figure 20:
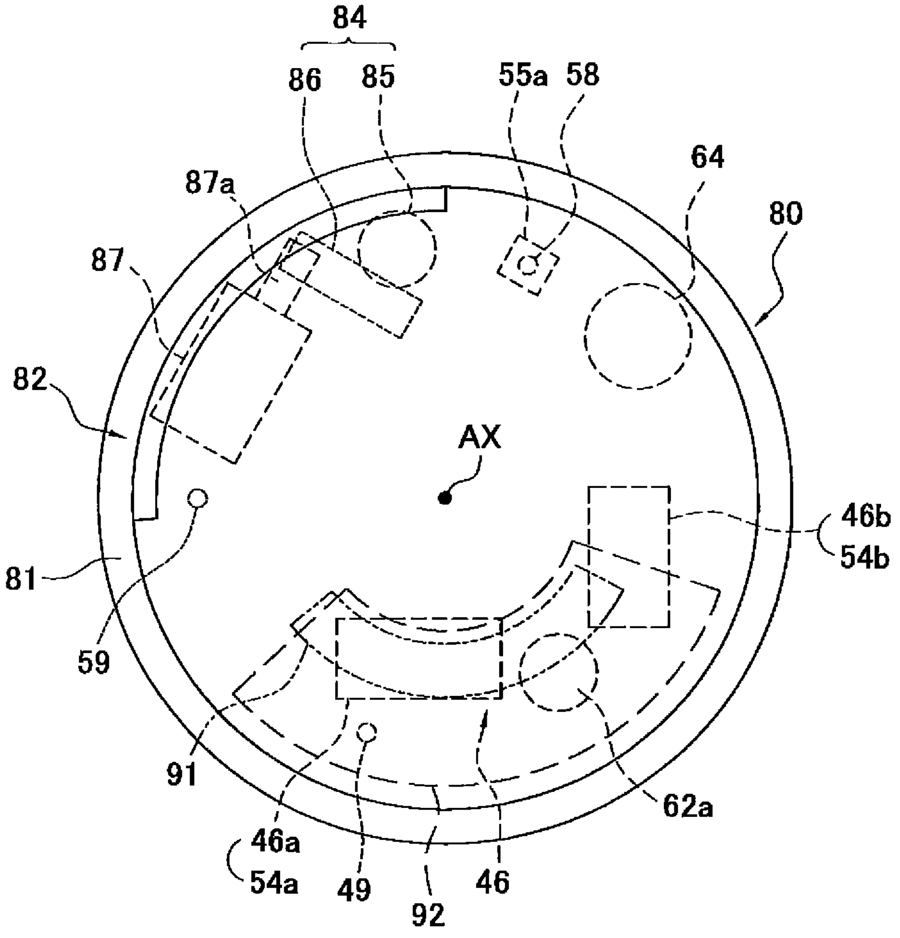
FIG. 20 shows the positional relation of the various members in plan view when viewed in the optical axis direction.

As shown in FIG. 20, several of the constituent members included in the interchangeable lens unit 2 are dispersed over a plane when viewed in the optical axis direction.

More specifically, the zoom motor 87 and the transmission mechanism 84 are disposed at positions that do not overlap the focus motor 64, the lens-side contact unit 91, the electrical board 92, the aperture drive motor 62*a*, the correction drive unit 46 (the first magnet 54*a*, the second magnet 54*b*, the first coil 46*a*, and the second coil 46*b*), the focusing main shaft 58, the focusing sub-shaft 59, or the restricting shaft 49*b* when viewed in the optical axis direction.

The focus motor 64 is disposed at a position that does not overlap the zoom motor 87, the transmission mechanism 84, the lens-side contact unit 91, the electrical board 92, the aperture drive motor 62*a*, the correction drive unit 46, the focusing main shaft 58, the focusing sub-shaft 59, or the restricting shaft 49*b* when viewed in the optical axis direction.

The lens-side contact unit 91 is disposed at a position that does not overlap the zoom motor 87, the transmission mechanism 84, the focus motor 64, the focusing main shaft 58, the focusing sub-shaft 59, or the restricting shaft 49*b* when viewed in the optical axis direction. To put this the other way, at least part of the lens-side contact unit 91 overlaps, the electrical board 92, the aperture drive motor 62*a*, and the correction drive unit 46 when viewed in the optical axis direction.

The electrical board 92 is disposed at a position that does not overlap the zoom motor 87, the transmission mechanism 84, the focus motor 64, the focusing main shaft 58, or the focusing sub-shaft 59 when viewed in the optical axis direction. To put this the other way, at least part of the electrical board 92 overlaps the lens-side contact unit 91, the aperture drive motor 62*a*, the correction drive unit 46, and the restricting shaft 49*b* when viewed in the optical axis direction.

The aperture drive motor 62*a* is disposed at a position that does not overlap the zoom motor 87, the transmission mechanism 84, the focus motor 64, the correction drive unit 46, the focusing main shaft 58, the focusing sub-shaft 59, or the restricting shaft 49*b* when viewed in the optical axis direction. To put this the other way, at least part of the aperture drive motor 62*a* overlaps the lens-side contact unit 91 and the electrical board 92 when viewed in the optical axis direction.

The correction drive unit 46 is disposed at a position that does not overlap the zoom motor 87, the transmission mechanism 84, the focus motor 64, the aperture drive motor 62*a*, the focusing main shaft 58, the focusing sub-shaft 59, or the restricting shaft 49*b* when viewed in the optical axis direction. To put this the other way, at least part of the correction drive unit 46 overlaps the lens-side contact unit 91 and the electrical board 92 when viewed in the optical axis direction.

The focusing main shaft 58 and the focusing sub-shaft 59 are disposed at positions that do not overlap the zoom motor 87, the transmission mechanism 84, the focus motor 64, the lens-side contact unit 91, the electrical board 92, the aperture drive motor 62*a*, the correction drive unit 46, or the restricting shaft 49*b* when viewed in the optical axis direction.

The restricting shaft 49*b* is disposed at a position that does not overlap the zoom motor 87, the transmission mechanism 84, the focus motor 64, the lens-side contact unit 91, the aperture drive motor 62*a*, the correction drive unit 46, the focusing main shaft 58, or the focusing sub-shaft 59 when viewed in the optical axis direction. To put this the other way, restricting shaft 49*b* overlaps the electrical board 92 when viewed in the optical axis direction.

As described above, the interchangeable lens unit 2 can be made more compact (and thinner in particular) by dispersively arranging several of the constituent members included in the interchangeable lens unit 2 over a plane.

Also, the aperture drive motor 62*a* is disposed at a position that does not overlap the correction drive unit 46 (discussed below) when viewed in the optical axis direction. Therefore, any magnetic flux that leaks from the correction drive unit 46 will have less effect on the aperture drive motor 62*a*, so the operation of the aperture unit 62 can be stabilized while the interchangeable lens unit 2 is made more compact.

The phrase "when viewed in the optical axis direction" means "when viewed in a direction parallel to the optical axis in a state in which at least members whose positional relations are to be compared can be seen by presumptively removing other members." Therefore, regardless of whether or not the various members can be seen from the outside of the interchangeable lens unit 2, the above-mentioned positional relations may be determined by presumptively taking out just the members to be compared.

Camera Body 3

The simplified configuration of the camera body 3 will be described through reference to FIGS. 1 to 3A and 3B. As shown in FIGS. 1 to 3A and B, the camera body 3 has a housing 3*a*, the body mount 4, an interface unit 39, an image acquisition component 35, an image display component 36, a viewfinder component 38, a body controller 10, and a battery 22. The camera body 3 does not have a quick-return mirror installed between the body mount 4 and the imaging sensor 11.

(1) Housing 3*a*

Figure 3A:
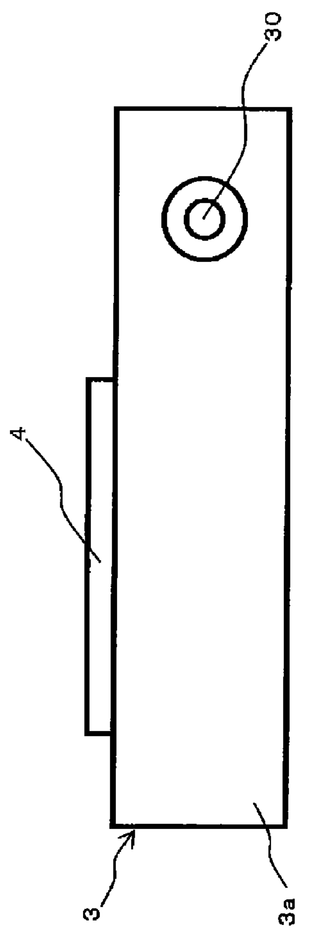
FIG. 3A is a top view of the camera body 3.
Figure 3B:
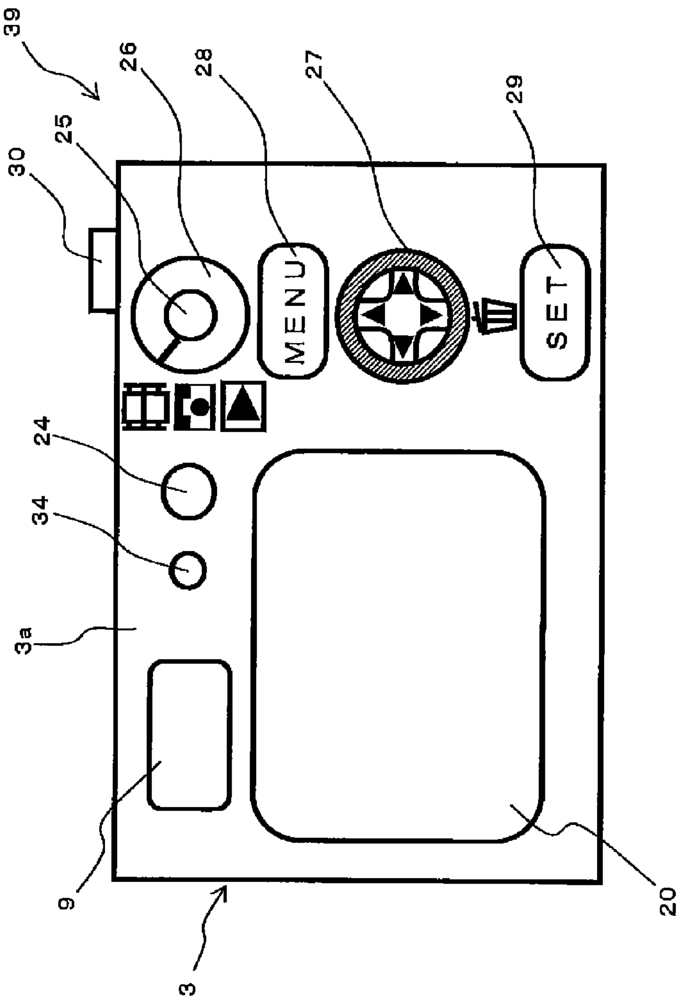
FIG. 3B is a rear view of the camera body 3.
Figure 4:
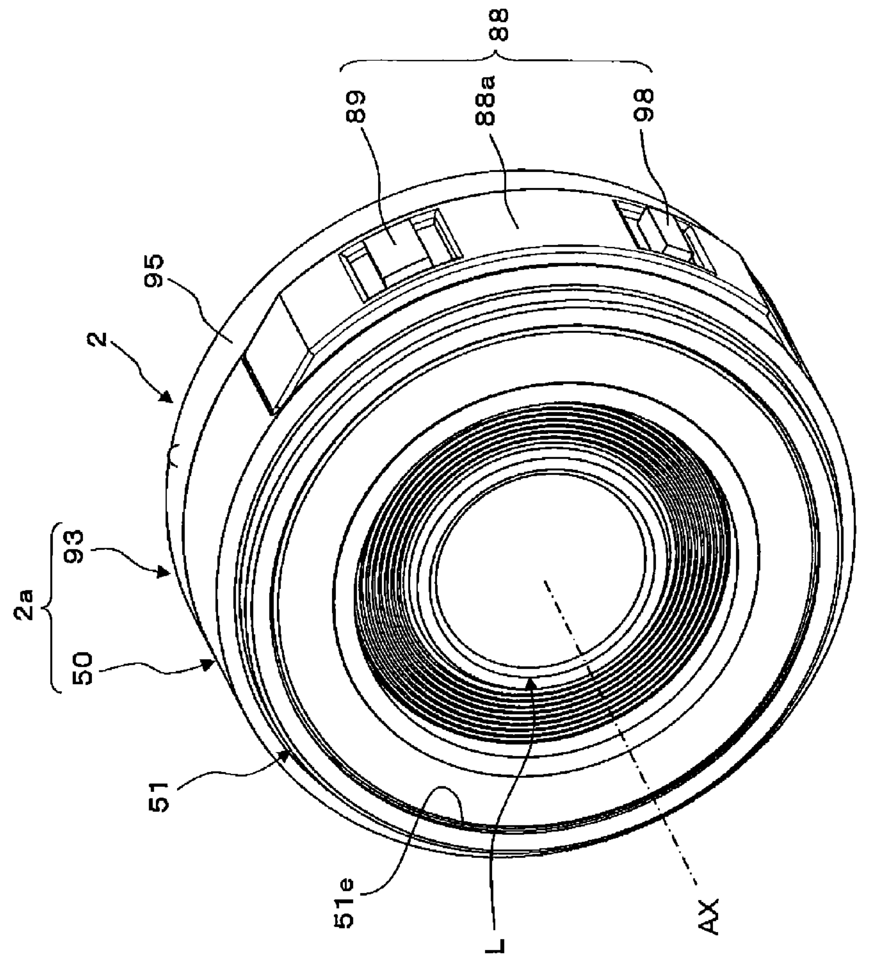
FIG. 4 is an oblique perspective view of an interchangeable lens unit 2.

The housing 3*a* constitutes the outer shell of the camera body 3. As shown in FIGS. 3A and 3B, the body mount 4 is provided to the front face of the housing 3*a*. The interface unit 39 is provided to the rear and top faces of the housing 3*a*. More specifically, the rear face of the housing 3*a* is provided with a display component 20, a power switch 25, a mode selector dial 26, a cross key 27, a menu setting button 28, a set button 29, an imaging mode button 34, and a moving picture imaging button 24. The top face of the housing 3*a* is provided with a shutter button 30.

(2) Body Mount 4

The lens mount 95 of the interchangeable lens unit 2 is mounted to the body mount 4. The body mount 4 has a bayonet (not shown) that engages with the bayonet 95*a* of the lens mount 95. Also, the body mount 4 has a body-side contact unit (not shown). In a state in which the lens mount 95 has been mounted to the body mount 4, the contacts of the lens-side contact unit 91 are in contact with the contacts of the body-side contact unit. In this state, the camera body 3 can send and receive data to and from the interchangeable lens unit 2 via the body mount 4 and the lens mount 95. For instance, the body controller 10 (discussed below) sends a control signal such as an exposure synchronization signal through the body mount 4 and the lens mount 95 to the lens controller 40.

(3) Interface Unit 39

As shown in FIGS. 3A and 3B, the interface unit 39 has various interface members that allow the user to input operation information. For example, the power switch 25 is used to turn on and off the power to the digital camera 1 or the camera body 3. When the power switch 25 is switched on, power is supplied to the various components of the camera body 3 and the interchangeable lens unit 2.

The mode selector dial 26 is used to switch the operating mode between a still picture imaging mode, a moving picture imaging mode, a reproduction mode, and so forth. The user turns the mode selector dial 26 to switch the operating mode of the digital camera 1. When the still picture imaging mode is selected with the mode selector dial 26, the operating mode is switched to the still picture imaging mode. When the moving picture imaging mode is selected with the mode selector dial 26, the operating mode is switched to the moving picture imaging mode. In the moving picture imaging mode, basically moving picture imaging is possible. When the reproduction mode is selected with the mode selector dial 26, the operating mode is switched to the reproduction mode, allowing the captured image to be displayed on the display component 20.

The cross key 27 is used to select the left, right, up, and down directions. The cross key 27 is used for selecting the desired menu from various menu screens displayed on the display component 20, for example.

The menu setting button 28 is used for setting the various operations of the digital camera 1. The set button 29 is used for executing the operations of the various menus.

The moving picture imaging button 24 is used for starting and stopping the capture of moving pictures. Regardless of the setting of the mode selector dial 26, when the moving picture imaging button 24 is pressed, the operating mode is forcibly changed to the moving picture imaging mode, and moving picture imaging begins. When this moving picture imaging button 24 is pressed during the capture of a moving picture, the moving picture imaging ends and the operating mode is switched to the one selected on the mode selector dial 26. For example, if the still picture imaging mode has been selected with the mode selector dial 26 when the moving picture imaging button 24 is pressed, the operating mode is automatically switched to the still picture imaging mode after the moving picture imaging button 24 is pressed again.

The shutter button 30 is pressed by the user to capture an image. When the shutter button 30 is pressed, a timing signal is outputted to a body controller 10. The shutter button 30 is a two-stage switch that can be pressed half-way down or all the way down. Light metering and ranging are commenced when the user presses the button half-way down. When the user presses the shutter button 30 all the way down from a state in which the shutter button 30 has been pressed half-way down, a timing signal is outputted, and image data is acquired by the image acquisition component 35.

(4) Image Acquisition Component 35

The image acquisition component 35 mainly has a CCD (charge coupled device) or other such imaging sensor 11 (one example of an imaging element) that performs opto-electric conversion, a shutter unit 33 that adjusts the exposure state of the imaging sensor 11, a shutter controller 31 that controls the drive of the shutter unit 33 on the basis of a control signal from the body controller 10, and an imaging sensor drive controller 12 that controls the operation of the imaging sensor 11.

The imaging sensor 11 converts the optical image formed by the optical system O into image data. The imaging sensor 11 can be, for example, a CCD (charge coupled device) or a CMOS (complementary metal oxide semiconductor) sensor. The imaging sensor 11 outputs image data on the basis of a timing signal generated by the imaging sensor drive controller 12.

The shutter controller 31 controls a shutter drive motor 32 on the basis of a control signal sent from the body controller 10. For example, the shutter unit 33 is charged by the shutter drive motor 32.

The auto-focus method that is employed in this embodiment is a contrast detection method. Using a contrast detection method allows high-precision focal adjustment. However, some other method (such as a phase difference detection method) may be used instead as the auto-focus method.

(5) Body Controller

The body controller 10 controls the various components of the digital camera 1. More specifically, the body controller 10 is equipped with a CPU (not shown), a ROM (not shown), and a RAM (not shown). The programs held in the ROM are executed by the CPU, allowing the body controller 10 to perform a variety of functions. For instance, the body controller 10 has the function of detecting that the interchangeable lens unit 2 has been mounted to the camera body 3, or the function of acquiring from the interchangeable lens unit 2 focal distance information and other such information that is necessary for controlling the digital camera 1.

The body controller 10 is able to receive signals from the power switch 25, the shutter button 30, the mode selector dial 26, the cross key 27, the menu setting button 28, and the set button 29. Various information related to the camera body 3 are held in a memory 10*a* inside the body controller 10. The memory 10*a* is a nonvolatile memory, and is capable of holding stored information even when the power supply has been halted.

Also, the body controller 10 periodically produces a vertical synchronization signal, and produces an exposure synchronization signal on the basis of the vertical synchronization signal in parallel with the production of the vertical synchronization signal. The body controller 10 obtains the exposure start timing and the exposure stop timing based on the vertical synchronization signal beforehand, so, based on the timings, the body controller 10 can produce an exposure synchronization signal. The body controller 10 outputs a vertical synchronization signal to a timing generator (not shown), and outputs an exposure synchronization signal at a specific period to the lens controller 40 via the body mount 4 and the lens mount 95. The lens controller 40 acquires position information about the focus lens unit 75 in synchronization with the exposure synchronization signal.

The imaging sensor drive controller 12 produces an electronic shutter drive signal and a read signal of the imaging sensor 11 at a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer component (not shown) the image data produced by numerous opto-electrical conversion elements (not shown) present in the imaging sensor 11, according to the read signal.

The body controller 10 also controls the focus adjusting unit 72 via the lens controller 40.

The image data outputted from the imaging sensor 11 is sent from an analog signal processor 13 and successively processed by an A/D converter 14, a digital signal processor 15, a buffer memory 16, and an image compressor 17. The analog signal processor 13 subjects the image data outputted from the imaging sensor 11 to gamma processing or other such analog signal processing. The A/D converter 14 converts the analog signal outputted from the analog signal processor 13 into a digital signal. The digital signal processor 15 subjects the image data converted into a digital signal by the A/D converter 14 to digital signal processing such as noise elimination or contour enhancement. The buffer memory 16 is a RAM (Random Access Memory), and temporarily stores the image data. The image data stored in the buffer memory 16 is sent to and processed by first the image compressor 17 and then an image recorder 18. The image data stored in the buffer memory 16 is read at a command from an image recording controller 19 and sent to the image compressor 17. The image data sent to the image compressor 17 is compressed according to a command from the image recording controller 19. This compression adjusts the image data to a smaller data size than that of the original data. One example of the method for compressing the image data is the JPEG (Joint Photographic Experts Group) method in which compression is performed on each frame of image data. After this, the compressed image data is recorded by the image recording controller 19 to the image recorder 18. When a moving picture is recorded, JPEG can be used to compress a plurality of sets of image data, in which the image data is compressed for each frame. Alternatively, an H.264/AVC method can also be used, in which compression is performed on image data for a plurality of frames all at once.

The image recorder 18 produces a still picture file or moving picture file that is associated with specific information to be recorded with the image data, on the basis of a command from the image recording controller 19. The image recorder 18 then records the still picture file or moving picture file on the basis of a command from the image recording controller 19. The image recorder 18 is a removable memory and/or an internal memory, for example. The specific information to be recorded along with the image data includes the date and time the image was captured, focal distance information, shutter speed information, aperture value information, and imaging mode information. Still picture files are in Exif® format or a format similar to Exif® format, for example. Moving picture files are in H.264/AVC format or a format similar to H.264/AVC format, for example.

(6) Image Display Component

The image display component 36 has the display component 20 and an image display controller 21. The display component 20 is a liquid crystal monitor, for example. The display component 20 displays the image data recorded to the image recorder 18 or the buffer memory 16 as a visible image on the basis of a command from the image display controller 21. Possible display modes with the display component 20 are a display mode in which just the image data is displayed as a visible image, and a display mode in which the image data and information about the time of image capture are displayed as visible images.

(7) Viewfinder Component

The viewfinder component 38 has a liquid crystal viewfinder 8 that displays images acquired by the imaging sensor 11, and a viewfinder eyepiece window 9 provided to the rear face of the housing 3*a*. The user can see the image displayed on the liquid crystal viewfinder 8 by looking through the viewfinder eyepiece window 9.

(8) Battery

The battery 22 supplies electrical power to the various components of the camera body 3, and also supplies power to the interchangeable lens unit 2 via the lens mount 95. In this embodiment, the battery 22 is a rechargeable cell. The battery 22 may be a dry cell, or may be an external power supply with which power is supplied from the outside with a power cord.

Operation of Digital Camera

The operation of the digital camera 1 will now be described.

(1) Imaging Mode

This digital camera 1 has two imaging modes. More specifically, the digital camera 1 has a viewfinder imaging mode in which the user looks at the subject through the viewfinder eyepiece window 9, and a monitor imaging mode in which the user looks at the subject on the display component 20.

In the viewfinder imaging mode, the image display controller 21 drives the liquid crystal viewfinder 8, for example. As a result, an image of the subject (a so-called through-image) acquired by the imaging sensor 11 is displayed in the liquid crystal viewfinder 8.

In the monitor imaging mode, the image display controller 21 drives the display component 20, for example, and a real-time image of the subject is displayed on the display component 20. Switching between these two imaging modes can be accomplished with the imaging mode button 34.

(2) Still Picture Imaging

When the user presses the shutter button 30 all the way down, a command is sent from the body controller 10 to the lens controller 40 so that the aperture value of the optical system O will be set to the aperture value calculated on the basis of the light metering output of the imaging sensor 11. The aperture drive controller 42 is then controlled by the lens controller 40, and the aperture unit 62 is stopped down to the indicated aperture value. Simultaneously with the aperture value indication, a drive command is sent from the imaging sensor drive controller 12 to the imaging sensor 11, and a command to drive the shutter unit 33 is sent. The imaging sensor 11 is exposed by the shutter unit 33 for the length of time of the shutter speed calculated on the basis of the light metering output from the imaging sensor 19.

After image capture processing has been executed and imaging is finished, the body controller 10 sends a control signal to the image recording controller 19. The image recorder 18 records image data to an internal memory and/or a removable memory on the basis of a command from the image recording controller 19. The image recorder 18 records imaging mode information (whether it is an auto-focus imaging mode or a manual focus imaging mode), along with image data to an internal memory and/or a removable memory.

Upon completion of the exposure, the imaging sensor drive controller 12 reads the image data from the imaging sensor 11, and after specific image processing, image data is outputted to the image display controller 21 via the body controller 10. Consequently, a captured image is displayed on the display component 20.

Also, upon completion of exposure, the shutter unit 33 is reset to its initial position by the body controller 10. Also, a command is issued from the body controller 10 to the lens controller 40, directing the aperture drive controller 42 to reset the aperture unit 62 to its open position, and reset commands are issued by the lens controller 40 to the various units. Upon completion of the resetting, the lens controller 40 notifies the body controller 10 of reset completion. The body controller 10 confirms that the shutter button 30 has not been pressed after the receipt of reset completion information from the lens controller 40 and after a series of processing following exposure has been completed, and ends the imaging sequence.

(3) Moving Picture Imaging

The digital camera 1 also has the function of capturing moving pictures. In the moving picture imaging mode, image data is produced by the imaging sensor 11 at a specific period, and the image data thus produced is utilized to continuously carry out auto-focusing by the contrast detection method. In the moving picture imaging mode, a moving picture is recorded to the image recorder 18 when the shutter button 30 is pressed or when the moving picture imaging button 24 is pressed, and recording of the moving picture stops when the shutter button 30 or the moving picture imaging button 24 is pressed again.

Operation of Interchangeable Lens Unit 2

The operation of the interchangeable lens unit 2 will now be described.

(1) When Power is On

When the power switch 25 is switched on, power is supplied to the various components of the camera body 3 and the interchangeable lens unit 2. When power is supplied to the interchangeable lens unit 2, the interchangeable lens unit 2 is driven by the zoom motor 87 from its stowed state to its initial imaging state. More specifically, the zoom motor 87 is controlled by the lens controller 40 so that the cam frame 80 will rotate with respect to the fixed frame 50 by a specific angle.

When the zoom driveshaft 87*a* of the zoom motor 87 rotates, the cam frame 80 rotates with respect to the fixed frame 50 via the first transmission gear 85, the second transmission gear 86, and the gear component 82.

When the cam frame 80 rotates with respect to the fixed frame 50, the guide cam followers 83 are guided by the guide cam grooves 50*b*. As a result, the cam frame 80 moves to the subject side while rotating with respect to the fixed frame 50.

Also, when the cam frame 80 rotates with respect to the fixed frame 50, the first lens support frame 51 moves in the optical axis direction along with the cam frame 80. More specifically, since the rectilinear protrusions 51*b* are guided in the optical axis direction by the rectilinear grooves 50*a*, even though the cam frame 80 rotates with respect to the fixed frame 50, the first lens support frame 51 does not rotate with respect to the fixed frame 50. Therefore, as the cam frame 80 rotates, the inner peripheral cam followers 51*d* of the first lens support frame 51 are guided by the outer peripheral cam grooves 83*b* of the cam frame 80. As a result, the first lens support frame 51 moves to the subject side with respect to the cam frame 80. That is, the first lens support frame 51 is deployed from the fixed frame 50 to the subject side without rotating with respect to the fixed frame 50.

Furthermore, when the cam frame 80 rotates with respect to the fixed frame 50, the second lens support frame 69 moves in the optical axis direction along with the cam frame 80. More specifically, since the rotation of the moving frame 53 with respect to the fixed frame 50 is restricted by the rectilinear guide plates 56*a* of the fourth lens support frame 56, the moving frame 53 does not rotate with respect to the fixed frame 50 even though the cam frame 80 does rotate with respect to the fixed frame 50. Therefore, as the cam frame 80 rotates, the cam followers 53*e* to 53*g* of the moving frame 53 are guided by the inner peripheral cam grooves 83*a*. At this point, since the cam followers 53*e* to 53*g* are guided by the region extending in the circumferential direction of the inner peripheral cam grooves 83*a*, the moving frame 53 does not move in the optical axis direction with respect to the cam frame 80. That is, the moving frame 53 moves to the subject side with respect to the fixed frame 50 along with the cam frame 80.

Figure 6B:
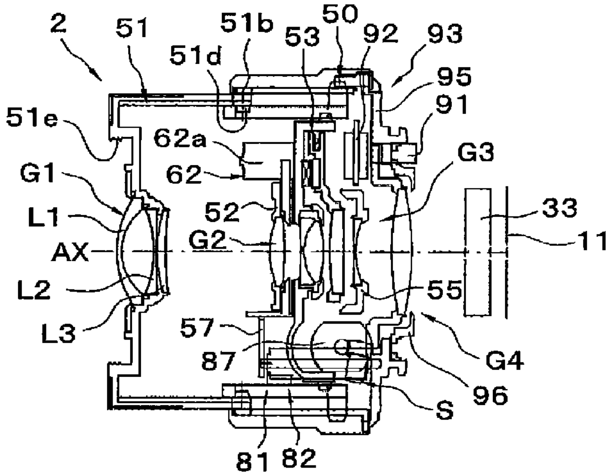
FIG. 6B is a simplified cross section of the interchangeable lens unit 2 at the wide angle end.

Thus, as shown in FIGS. 6B and 7B, the interchangeable lens unit 2 goes from its stowed state to its initial imaging state. In this embodiment, the optical system O is at the wide angle end when the interchangeable lens unit 2 is in its initial imaging state.

(2) During Zooming

The focal distance of the interchangeable lens unit 2 can be adjusted between the wide angle end and the telephoto end by operating the zoom lever 89. More specifically, when the zoom lever 89 is operated to the telephoto side, the zoom lever detector 90 detects this operation of the zoom lever 89, and the lens controller 40 controls the zoom motor 87 on the basis of the detection result of the zoom lever detector 90.

Figure 6C:
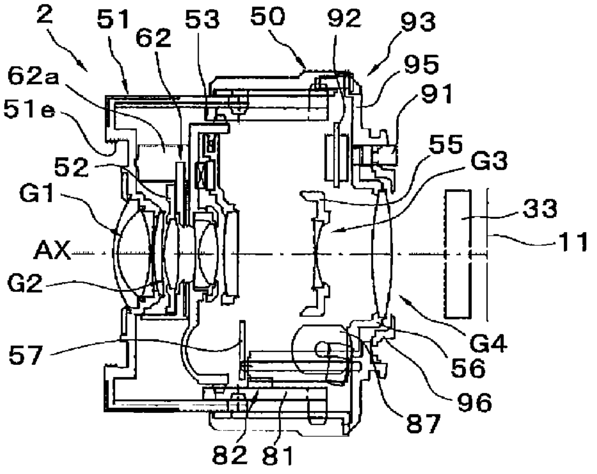
FIG. 6C is a simplified cross section of the interchangeable lens unit 2 at the telephoto end.

When the zoom driveshaft 87*a* of the zoom motor 87 rotates, the cam frame 80 rotates with respect to the fixed frame 50 via the transmission mechanism 84. The cam frame 80 rotates from the wide angle end to the telephoto end of the interchangeable lens unit 2 without moving in the optical axis direction with respect to the fixed frame 50. When the cam frame 80 rotates with respect to the fixed frame 50, the inner peripheral cam followers 51*d* are guided by the outer peripheral cam grooves 83*b*, and the first lens support frame 51 moves in the optical axis direction with respect to the fixed frame 50 according to the shape of the outer peripheral cam grooves 83*b*. In this embodiment, as shown in FIGS. 6C and 7C, the first lens support frame 51 moves to the image plane side with respect to the fixed frame 50, from the wide angle end to the telephoto end of the interchangeable lens unit 2.

Also, when the cam frame 80 rotates with respect to the fixed frame 50, the cam followers 53*e* to 53*g* of the moving frame 53 are guided by the inner peripheral cam grooves 83*a*, and the second lens support frame 69 moves in the optical axis direction with respect to the fixed frame 50 according to the shape of the inner peripheral cam grooves 83*a*. At this point, since the rotation of the moving frame 53 is restricted by the rectilinear guide plates 56*a* of the fourth lens support frame 56, the moving frame 53 moves in the optical axis direction without moving with respect to the fixed frame 50. In this embodiment, as shown in FIGS. 6C and 7C, the second lens support frame 69 moves to the subject side with respect to the fixed frame 50, from the wide angle end to the telephoto end of the interchangeable lens unit 2.

When the second lens support frame 69 moves to the subject side, the cam frame 80 rotates with respect to the fixed frame 50. At this point, the gear component 82 of the cam frame 80 moves into the cut-out 53*d* in the moving frame 53, and the gear component 82 passes through the cut-out 53*d*. Therefore, even though the gear component 82 is formed on the inner peripheral face of the cam frame 80, a large amount of movement of the second lens support frame 69 in the optical axis direction can be ensured.

The focal distance of the interchangeable lens unit 2 thus changes to the telephoto side according to how long the zoom lever 89 is operated.

The operation of the interchangeable lens unit 2 when the zoom lever 89 is operated to the wide angle side is the reverse of that when the zoom lever 89 is operated to the telephoto side, so it will not be described in detail here.

Features of Interchangeable Lens Unit 2

The features of the interchangeable lens unit 2 are compiled below.

Figure 13:
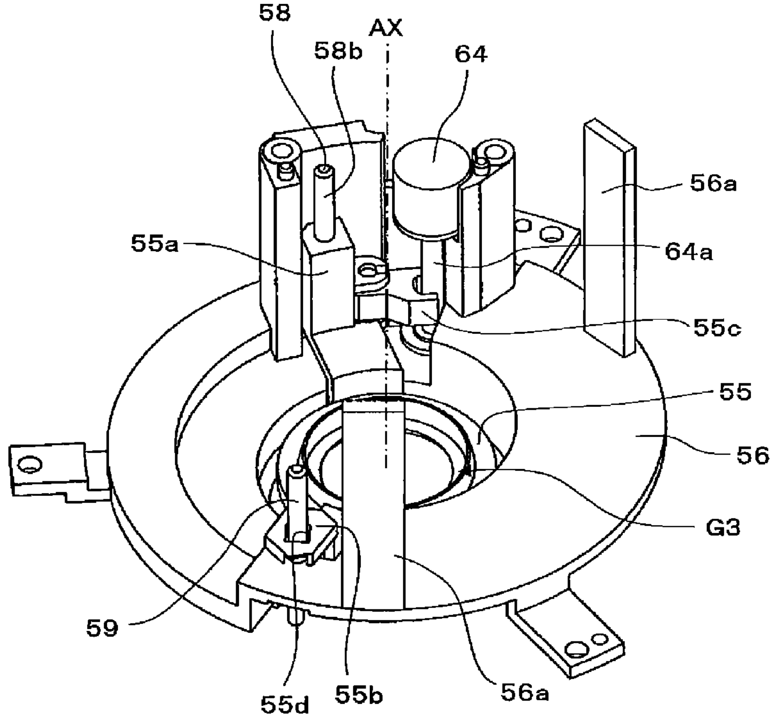
FIG. 13 is an oblique perspective view of a fourth lens support frame 56, a focus motor 64, and a third lens support frame 55.

(1) As shown in FIGS. 12B and 13A, the lengthwise direction L of the zoom motor 87 is different from the optical axis direction, so the zoom motor 87 takes up less space in the optical axis direction than when the lengthwise direction L of the zoom motor 87 is disposed so as to be the same as the optical axis direction. Consequently, the space around the zoom motor 87 can be utilized more effectively.

Since the rotational axis E1 of the zoom driveshaft 87*a* of the zoom motor 87 faces in a different direction from the optical axis direction, the zoom motor 87 takes up less space in the optical axis direction than when the rotational axis E1 of the zoom driveshaft 87*a* is disposed so as to be the same as the optical axis direction. Consequently, the space around the zoom motor 87 can be utilized more effectively.

Further, the zoom motor 87 is disposed on the inner peripheral side of the cam frame 80 in a state in which the total length in the optical axis direction of the lens housing 2*a* and the cam frame 80 is shortest (that is, the stowed state). Therefore, the length of the interchangeable lens unit 2 in the optical axis direction can be shortened as compared to when the zoom motor 87 and the cam frame 80 are disposed aligned in the optical axis direction.

As discussed above, a smaller size is possible with this interchangeable lens unit 2.

Since the rotational axis E1 of the zoom driveshaft 87*a* is disposed substantially parallel to a plane that is perpendicular to the optical axis direction, the zoom motor 87 takes up less space in the optical axis direction, and the interchangeable lens unit 2 can be made even more compact.

(2) Since the transmission mechanism 84 transmits the rotation of the zoom driveshaft 87*a* at reduced speed to the gear component 82 of the cam frame 80, the drive force of the zoom motor 87 can be amplified, so the zoom motor 87 can be made smaller. This allows the interchangeable lens unit 2 to be even more compact.

(3) As shown in FIG. 14, the rotational axis E3 of the second transmission gear 86 is inclined by an angle θ4 that is substantially the same as the lead angle of the second intermediate gear 86*b*, with respect to a plane that is perpendicular to the optical axis direction. Consequently, the zoom motor 87 and the transmission mechanism 84 can be disposed with more space-saving. Also, since the second intermediate gear 86*b* includes a worm gear, the second transmission gear 86 will not be driven in reverse even if an external force is exerted on the cam frame 80, and the strength of the interchangeable lens unit 2 against an external force can be raised.

(4) As shown in FIG. 14, the output gear 87*b* of the zoom motor 87 is disposed between the base member 93 and the first intermediate gear 86*a* of the second transmission gear 86. The second intermediate gear 86*b* is disposed closer to the base member 93 than the first intermediate gear 86*a*. Consequently, the zoom motor 87 and the transmission mechanism 84 can be disposed with even more space-saving.

(5) As shown in FIGS. 12B and 13A, since the zoom motor 87 and the transmission mechanism 84 are disposed on the inner peripheral side of the main body 81 of the cam frame 80, the space on the inner peripheral side of the main body 81 of the cam frame 80 can be effectively utilized, and this allows the interchangeable lens unit 2 to be even more compact.

Figure 8B:
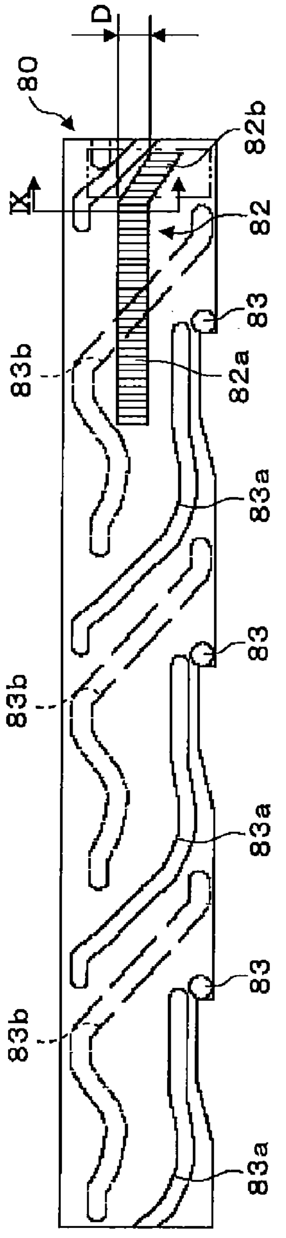
FIG. 8B is an inner peripheral development view of a cam frame 80.

(6) As shown in FIG. 8B, the gear component 82 is disposed at a substantially middle position of the main body 81 of the cam frame 80 in the optical axis direction. The zoom motor 87 and the transmission mechanism 84 are disposed more on the image plane side than the gear component 82. Consequently, the stowage space S on the image plane side of the gear component 82 can be effectively utilized.

(7) As shown in FIG. 20, the zoom motor 87 is disposed at a position that does not overlap the lens-side contact unit 91 when viewed in the optical axis direction. Therefore, these members can be dispersed over a plane, and the interchangeable lens unit 2 can be made thinner.

Also, the zoom motor 87 is disposed at a position that does not overlap the electrical board 92 when viewed in the optical axis direction. Therefore, these members can be dispersed over a plane, and the interchangeable lens unit 2 can be made thinner.

Also, the focus motor 64 is disposed at a position that does not overlap the lens-side contact unit 91 when viewed in the optical axis direction. Therefore, these members can be dispersed over a plane, allowing the interchangeable lens unit 2 to be made thinner.

Further, the focus motor 64 is disposed at a position that does not overlap the electrical board 92 when viewed in the optical axis direction. Therefore, these members can be dispersed over a plane, allowing the interchangeable lens unit 2 to be made thinner.

(8) As shown in FIG. 13B, since the focus driveshaft 64*a* has a lead screw that meshes with the rack 55*c* of the third lens support frame 55, the focus driveshaft 64*a* can drive the third lens support frame 55 directly, and this improves the drive accuracy of the eighth lens L8.

(9) As shown in FIG. 20, the zoom motor 87 is disposed at a position that does not overlap the correction drive unit 46 when viewed in the optical axis direction. Therefore, these members can be dispersed over a plane, allowing the interchangeable lens unit 2 to be made thinner.

Also, the focus motor 64 is disposed at a position that does not overlap the correction drive unit 46 when viewed in the optical axis direction. Therefore, these members can be dispersed over a plane, allowing the interchangeable lens unit 2 to be made thinner.

(10) As shown in FIG. 20, the focusing main shaft 58 is disposed at a position that does not overlap the zoom motor 87 or the focus motor 64 when viewed in the optical axis direction. Therefore, these members can be dispersed over a plane, allowing the interchangeable lens unit 2 to be made thinner.

Also, the focusing sub-shaft 59 is disposed at a position that does not overlap the zoom motor 87 or the focus motor 64 when viewed in the optical axis direction. Therefore, these members can be dispersed over a plane, allowing the interchangeable lens unit 2 to be made thinner.

Also, the focusing main shaft 58 is disposed at a position that does not overlap the correction drive unit 46 when viewed in the optical axis direction. Therefore, these members can be dispersed over a plane, allowing the interchangeable lens unit 2 to be made thinner.

Furthermore, the focusing sub-shaft 59 is disposed at a position that does not overlap the correction drive unit 46 when viewed in the optical axis direction. Therefore, these members can be dispersed over a plane, allowing the interchangeable lens unit 2 to be made thinner.

(11) As shown in FIGS. 7A to 7C, since the holder 53*c* is provided to the moving frame 53, this prevents the range of movement of the moving frame 53 from being restricted by the focusing sub-shaft 59.

Also, when the moving frame main body 53*a* approaches the third lens support frame 55, the holder 53*c* covers the end of the focusing sub-shaft 59, which prevents an increase in unwanted light as compared to when the holder 53*c* is merely a cylindrical portion or a through-hole.

(12) As shown in FIG. 20, the zoom motor 87 is disposed at a position that does not overlap the aperture drive motor 62*a* when viewed in the optical axis direction. Therefore, these members can be dispersed over a plane, allowing the interchangeable lens unit 2 to be made thinner.

Also, the focus motor 64 is disposed at a position that does not overlap the aperture drive motor 62*a* when viewed in the optical axis direction. Therefore, these members can be dispersed over a plane, allowing the interchangeable lens unit 2 to be made thinner.

(13) As shown in FIG. 20, the restricting shaft 49*b* is disposed at a position that does not overlap the aperture unit 62 when viewed in the optical axis direction. Therefore, these members can be dispersed over a plane, allowing the interchangeable lens unit 2 to be made thinner.

(14) As shown in FIGS. 16A and 16B, the focus motor 64 is disposed in the circumferential direction between the cam follower 53*e* and the cam follower 53*f* when viewed in the optical axis direction. Therefore, the space between the cam follower 53*e* and the cam follower 53*f* can be utilized more effectively.

Furthermore, the central angle θ1 between the cam follower 53*e* and the cam follower 53*f* is greater than the central angle θ2 between the cam follower 53*f* and the cam follower 53*g*, and is greater than the central angle θ3 between the cam follower 53*g* and the cam follower 53*e*. Therefore, the central angle θ1 between the cam follower 53*e* and the cam follower 53*f* where the focus motor 64 is disposed is widest, so the space between the cam follower 53*e* and the cam follower 53*f* can be utilized more effectively.

(15) As shown in FIGS. 16A and 16B, the moving frame 53 has the cut-out 53*d* formed between the cam follower 53*e* and the cam follower 53*f*. The focus motor 64 is disposed in the cut-out 53*d* when viewed in the optical axis direction. Therefore, this prevents the focus motor 64 from interfering with the moving frame 53, and allows a large range of movement of the moving frame 53 to be ensured.

(16) As shown in FIGS. 7A to 7C, the gear component 82 of the cam frame 80 passes through the cut-out 53*d* as the moving frame 53 is guided by the cam frame 80 in the optical axis direction. Accordingly, even though the gear component 82 is formed on the inner peripheral side of the cam frame 80, the moving frame 53 can be prevented from interfering with the gear component 82.

(17) As shown in FIG. 15, since the rotational axis E1 of the zoom driveshaft 87*a* is disposed along the circumferential direction of the cam frame 80, the zoom motor 87 can be efficiently disposed according to the shape of the cam frame 80.

Figure 10B:
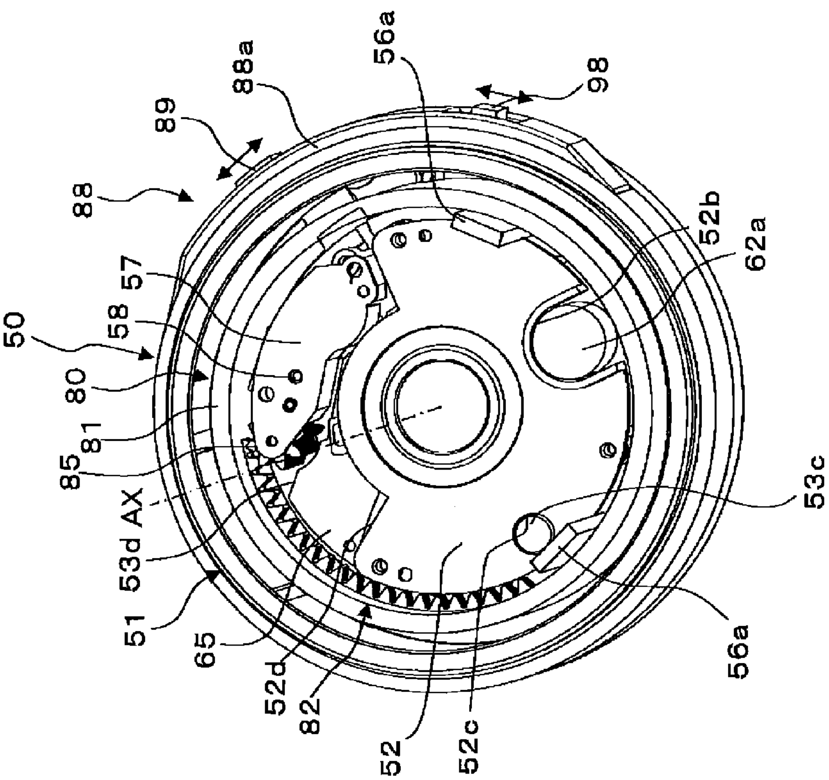
FIG. 10B is an oblique perspective view of the interchangeable lens unit 2 when a first lens support frame 51 has been removed.
Figure 10A:
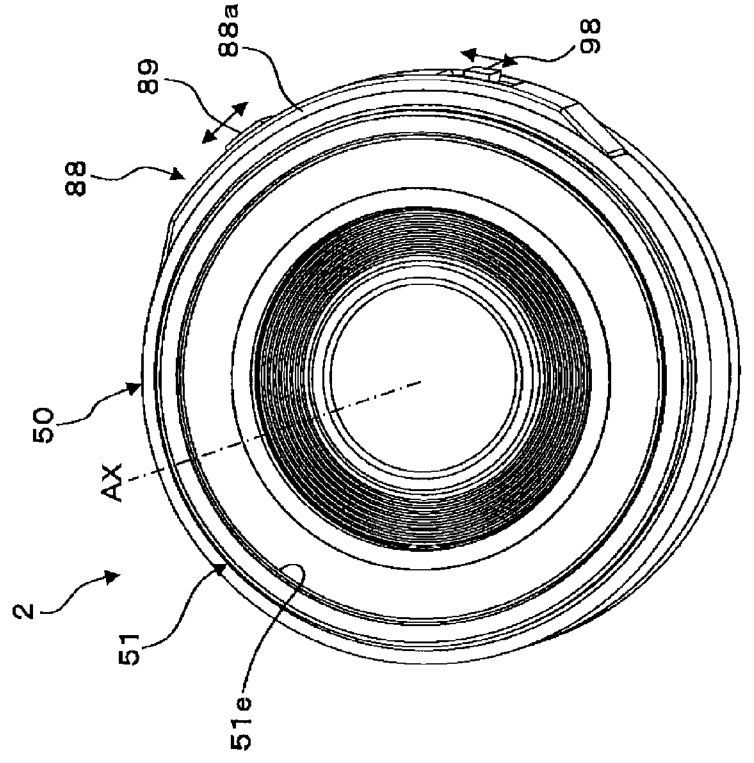
FIG. 10A is an oblique perspective view of the interchangeable lens unit 2.
Figure 11B:
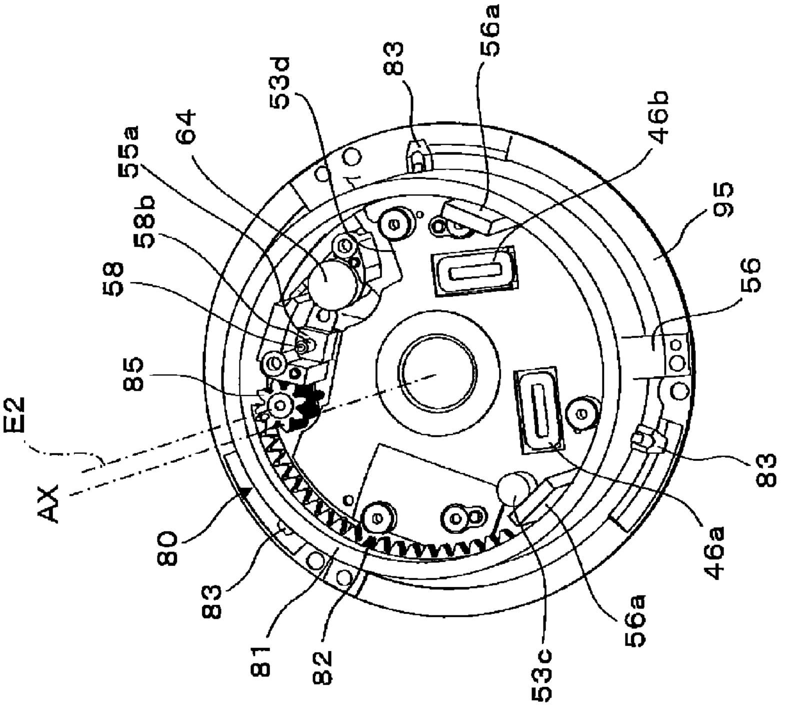
FIG. 11B is an oblique perspective view of the interchangeable lens unit 2, which is similar to FIG. 11A except that when an aperture unit 62 and the fixed frame 50 have been removed.
Figure 11A:
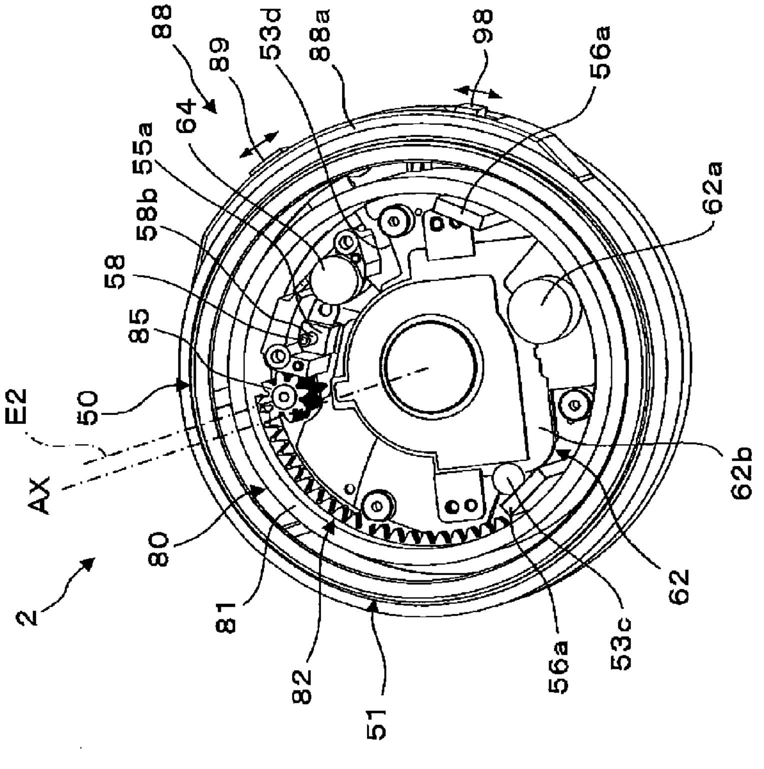
FIG. 11A is an oblique perspective view of the interchangeable lens unit 2, which is similar to FIG. 10A except that a front lens frame 52 and a first support cover 57 have been removed.

(18) As shown in FIG. 10B, the focusing main shaft 58 is supported by the base member 93 (more precisely, the fourth lens support frame 56) and the first support cover 57. More specifically, the first end 58*a* of the focusing main shaft 58 is fixed to the fourth lens support frame 56, and the second end 58*b* of the focusing main shaft 58 is fixed to the first support cover 57 (see FIGS. 7A to 7C).

Furthermore, the first transmission gear 85 is rotatably supported by the base member 93 (more precisely, the fourth lens support frame 56) and the first support cover 57.

Since the focusing main shaft 58 and the first transmission gear 85 are thus supported together by the first support cover 57, fewer parts are needed and the interchangeable lens unit 2 can be made more compact.

Second Embodiment

In the first embodiment given above, the zoom lever 89 and the focus lever 98 are used to change the focal distance and adjust the focus. However, changing the focal distance may be accomplished using a zoom ring, and focusing may be accomplished using a focus ring. An interchangeable lens unit 302 pertaining to a second embodiment will now be described, using a zoom ring as an example.

Those components that have substantially the same function as those in the first embodiment above will be numbered the same and will not be described in detail again.

Figure 21:
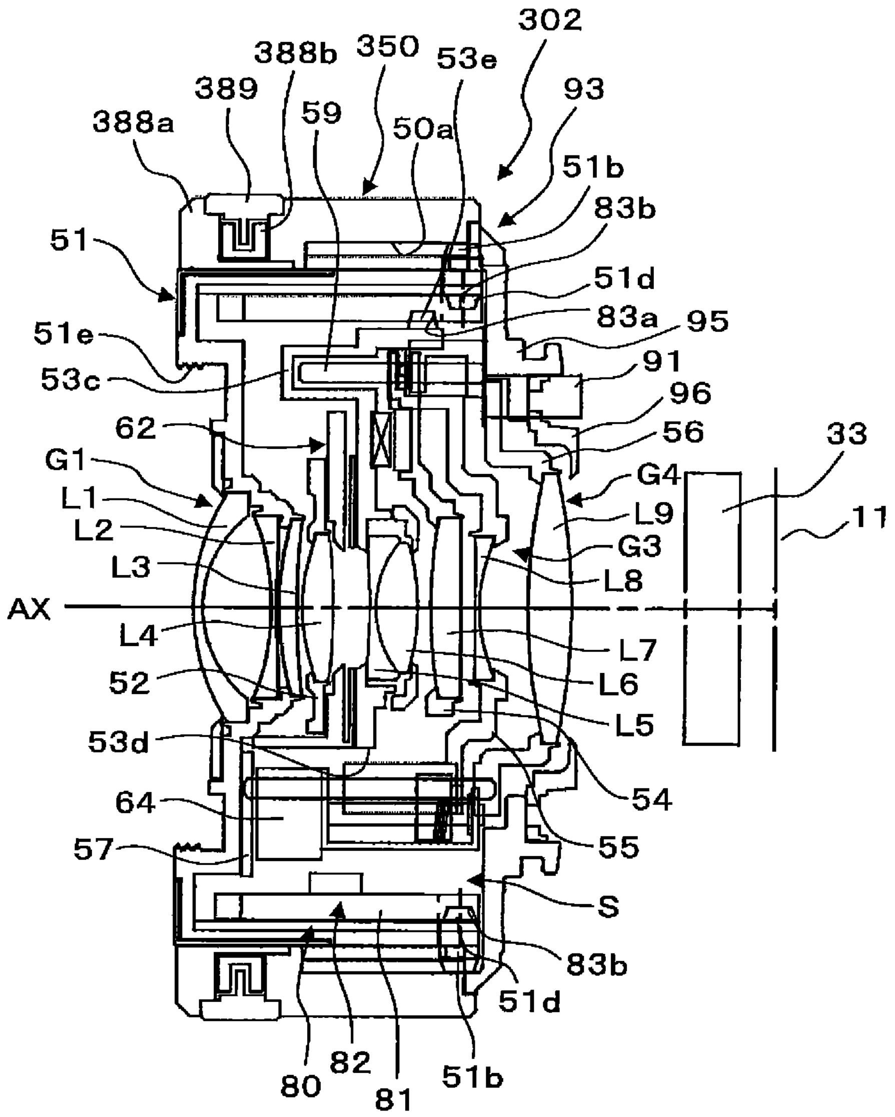
FIG. 21 is a simplified cross section of an interchangeable lens unit 302 in its stowed state.

The interchangeable lens unit 302 shown in FIG. 21 is equipped with a zoom ring unit 388. The zoom ring unit 388 has a stop ring 388*a* (one example of a restricting member) and a zoom ring 389 (one example of an interface member). The stop ring 388*a* is an annular member, and is mounted to the end on the subject side of a fixed frame 350. The stop ring 388*a* can also be said to be disposed on the opposite side of the fixed frame 350 from the base member 93. The zoom ring 389 is an annular member and is sandwiched between the fixed frame 350 and the stop ring 388*a*. The zoom ring 389 is rotatably supported by the fixed frame 350 and the stop ring 388*a*, and its movement is restricted in the optical axis direction with respect to the fixed frame 350.

Also, a rotation detector 388*b* is provided on the inner peripheral side of the zoom ring 389. The rotation detector 388*b* is capable of detecting the rotation direction and angle of the zoom ring 389. This allows the lens controller 40 to ascertain the direction and amount in which the zoom ring 389 is operated. The zoom ring 389 is disposed more to the subject side than the zoom motor 87.

The focal distance can also be adjusted with this constitution.

The zoom ring 389 may be rotatably supported by the stop ring 388*a* and/or the fixed frame 350.

Other Embodiments

The present invention is not limited to the embodiments given above, and various modifications and adjustments are possible without departing from the gist of the invention.

Those components that have substantially the same function as those in the first and second embodiments above will be numbered the same and will not be described in detail again.

(1) In the above embodiments, an imaging device is described by using the digital camera 1 as an example, but the imaging device is not limited to being the digital camera 1. For instance, the digital camera 1 can perform still picture imaging and moving picture imaging, but the imaging device may be one that performs only still picture imaging, or one that performs only moving picture imaging.

(2) In the above embodiments, a lens barrel is described using the interchangeable lens units 2 and 302 as an example, but the lens barrel is not limited to being the interchangeable lens unit 2 or 302. For example, the lens barrel may be one that is used in an imaging device that has an integrated construction, rather than employing an interchangeable lens unit.

(3) In the above embodiments, a first actuator is described using the zoom motor 87 as an example, but the first actuator is not limited to being the zoom motor 87. For example, the first actuator may be some motor other than one used for zoom adjustment. Also, the first actuator is not limited to being a DC motor, and may be some other type of motor (such as a stepping motor).

Also, a second actuator is described using the focus motor 64 as an example in the above embodiments, but the second actuator is not limited to being the focus motor 64. For example, the second actuator may be some motor other than one used for focus adjustment. Also, the second actuator is not limited to being a stepping motor, and may be some other type of motor (such as a DC motor).

Furthermore, the first actuator may be an actuator other than a motor, such as a piezoelectric actuator. More specifically, as shown in FIG. 22A, a piezoelectric actuator 187 is mounted to the lens housing 2*a* (more precisely, the fourth lens support frame 56). The lengthwise direction L of the piezoelectric actuator 187 is different from the optical axis direction. More precisely, as shown in FIG. 22A, the lengthwise direction L of the piezoelectric actuator 187 is disposed substantially parallel to a plane that is perpendicular to the optical axis direction (that is, the paper plane in FIG. 22A), just as with the rotational axis E1 of the zoom motor 87.

The piezoelectric actuator 187 is in contact with a second transmission gear 186 of the transmission mechanism 84. The second transmission gear 186 corresponds to the above-mentioned second transmission gear 86. As shown in FIG. 22B, when voltage is applied to the piezoelectric actuator 187, the piezoelectric actuator 187 is displaced in the direction indicated by the arrow. This displacement of the piezoelectric actuator 187 imparts rotational force to the second transmission gear 186, and the second transmission gear 186 rotates around the rotational axis E3. As a result, the cam frame 80 rotates via the first transmission gear 85.

Figure 22C:
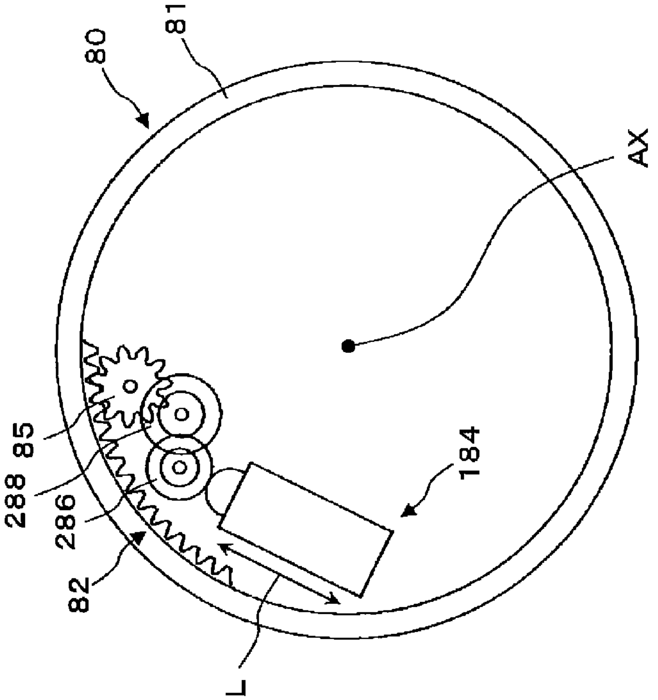
FIG. 22C is a simplified layout diagram of the piezoelectric actuator 187.
Figure 22B:
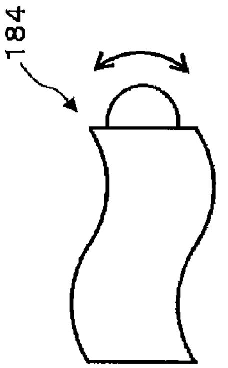
FIG. 22B is a diagram illustrating the operation of the piezoelectric actuator 187.
Figure 22A:
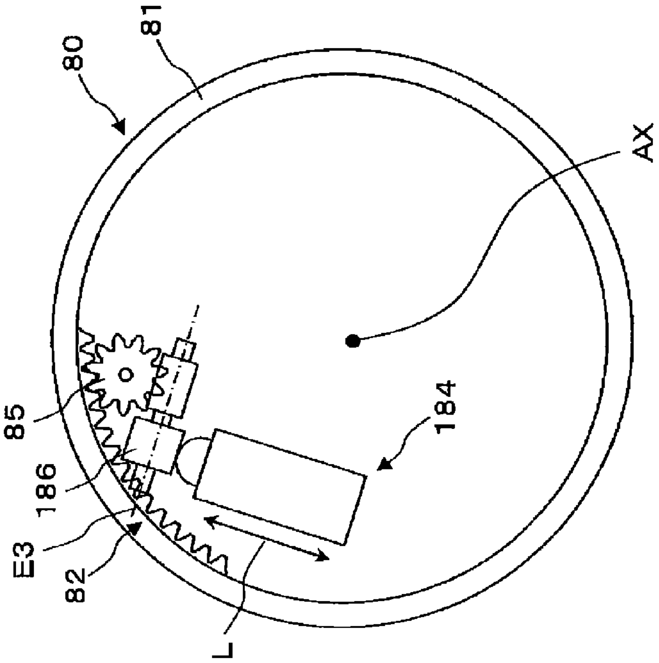
FIG. 22A is a simplified layout diagram of a piezoelectric actuator 187.

Also, the configuration shown in FIG. 22C is possible for the transmission mechanism 84 when the piezoelectric actuator 187 is used. More specifically, as shown in FIG. 22C, the member that is in contact with the piezoelectric actuator 187 may be a rotating member 286. The displacement of the piezoelectric actuator 187 imparts rotational force to the rotating member 286, causing the rotating member 286 to rotate. The rotation of the rotating member 286 is transmitted through an intermediate transmission gear 288 to the first transmission gear 85, and the cam frame 80 rotates as a result.

As described above, since the lengthwise direction L of the piezoelectric actuator 187 is different from the optical axis direction, the interchangeable lens unit 2 can be made more compact, just as in the above embodiments.

(4) In the above embodiments, a transmission mechanism is described using the transmission mechanism 84 as an example, but the transmission mechanism is not limited to being the transmission mechanism 84. As long as the transmission mechanism has a configuration in which drive force is transmitted from the driveshaft of a first actuator to a second frame, the transmission mechanism may have some other configuration. For instance, the transmission mechanism 84 may have a spur gear or another such member besides the first transmission gear 85 and the second transmission gear 86, or the structure of the transmission mechanism 84 may be simpler than the structure discussed above.

Also, a first transmission gear member is described using the first transmission gear 85 as an example in the above embodiments, but the first transmission gear member is not limited to being the first transmission gear 85. For example, the lens barrel can be made more compact even if the rotational axis E2 of the first transmission gear 85 is not parallel to the optical axis direction.

Also, a second transmission gear member is described using the second transmission gear 86 as an example in the above embodiments, but the second transmission gear member is not limited to being the second transmission gear 86. For example, the lens barrel can be made more compact even if the rotational axis E3 of the second transmission gear 86 is parallel to the optical axis direction.

(5) In the above embodiments, the rotational axis E3 of the second transmission gear 86 is inclined by the angle of θ4, which is substantially the same as the lead angle of the second intermediate gear 86*b*, with respect to a plane that is perpendicular to the optical axis direction, but the rotational axis E3 of the second transmission gear 86 may not be inclined with respect to a plane that is perpendicular to the optical axis direction.

Also, in the above embodiments, the output gear 87*b* of the zoom motor 87 is disposed between the first intermediate gear 86*a* of the second transmission gear 86 and the base member 93, but the zoom motor 87 and the second transmission gear 86 are not limited to having this layout.

(6) In the above embodiments, the rotational axis E1 of the zoom driveshaft 87*a* is disposed parallel to a plane that is perpendicular to the optical axis direction, but the lens barrel can be made more compact as long as the lengthwise direction of the first actuator is different from the optical axis direction. For example, the lengthwise direction L of the zoom motor 87 (the rotational axis E1 of the zoom driveshaft 87*a*) may be inclined with respect to a plane that is perpendicular to the optical axis direction, to the extent that a reduction in lens barrel size can be achieved even though the lengthwise direction L of the zoom motor 87 (the rotational axis E1 of the zoom driveshaft 87*a*) is not completely parallel to a plane that is perpendicular to the optical axis direction.

Similarly, the lengthwise direction L of the piezoelectric actuator 187 shown in FIGS. 22A and 22C may be inclined with respect to a plane that is perpendicular to the optical axis direction, to the extent that a reduction in lens barrel size can be achieved even though the lengthwise direction L of the piezoelectric actuator 187 is not completely parallel to a plane that is perpendicular to the optical axis direction.

(7) In the above embodiments, a first frame is described using the base member 93 as an example, but the first frame is not limited to being the base member 93. For example, the first frame may be constituted by a single member.

Also, in the above embodiments, a second frame is described using the cam frame 80 as an example, but the second frame is not limited to being the cam frame 80. For example, the cam frame 80 in the above embodiments moves in the optical axis direction with respect to the base member 93, but the second frame may not move in the optical axis direction with respect to the first frame.

(8) In the above embodiments, the transmission mechanism 84 transmits the rotation of the zoom driveshaft 87*a* to the gear component 82 of the cam frame 80 after reducing its speed, but the transmission mechanism 84 may instead transmit the rotation of the zoom driveshaft 87*a* to the gear component 82 without reducing its speed. Also, the gear component 82 is disposed substantially at a middle position of the main body 81 in the above embodiments, but the position of the gear component 82 may deviated from the middle position in the optical axis direction, and may be formed at the end of the main body 81.

(9) In the above embodiments, an interface member is described using the zoom lever 89, the focus lever 98, and the zoom ring 389 as examples, but the interface member may be a focus ring used in adjusting the focus.

(10) In the above embodiments, the zoom motor 87 is disposed at a position that does not overlap the lens-side contact unit 91 or the electrical board 92 when viewed in the optical axis direction, but as long as the interchangeable lens unit 2 can be made more compact, the zoom motor 87 may overlap the lens-side contact unit 91 and the electrical board 92 when viewed in the optical axis direction.

Also, in the above embodiment, the focus motor 64 is disposed at a position that does not overlap the lens-side contact unit 91 or the electrical board 92 when viewed in the optical axis direction, but as long as the interchangeable lens unit 2 can be made more compact, the focus motor 64 may overlap the lens-side contact unit 91 and the electrical board 92 when viewed in the optical axis direction.

(11) In the above embodiments, the rotational axis E4 of the focus driveshaft 64*a* of the focus motor 64 is parallel to the optical axis direction, but the rotational axis E4 of the focus driveshaft 64*a* may be inclined with respect to the optical axis direction.

Also, in the above embodiments, the focus driveshaft 64*a* has a lead screw, and the third lens support frame 55 has the rack 55*c*. However, the configuration for driving the third lens support frame 55 is not limited to this configuration.

(12) In the above embodiments, the zoom motor 87 is disposed at a position that does not overlap the correction drive unit 46 when viewed in the optical axis direction, but as long as the interchangeable lens unit 2 can be made more compact, the zoom motor 87 may overlap the correction drive unit 46 when viewed in the optical axis direction.

Also, in the above embodiments, the focus motor 64 is disposed at a position that does not overlap the correction drive unit 46 when viewed in the optical axis direction, but as long as the interchangeable lens unit 2 can be made more compact, the focus motor 64 may overlap the correction drive unit 46 when viewed in the optical axis direction.

(13) In the above embodiments, a guide member is described using the focusing main shaft 58 as an example, but the guide member is not limited to being the focusing main shaft 58. Also, a rotation restricting member is described using the focusing sub-shaft 59 as an example, but the rotation restricting member is not limited to being the focusing sub-shaft 59.

For example, in the above embodiments, the focusing main shaft 58 and the focusing sub-shaft 59 are disposed at a position that does not overlap the zoom motor 87 when viewed in the optical axis direction, but as long as the interchangeable lens unit 2 can be made more compact, the focusing main shaft 58 and the focusing sub-shaft 59 may overlap the zoom motor 87 when viewed in the optical axis direction.

Also, in the above embodiments, the focusing main shaft 58 and the focusing sub-shaft 59 are disposed at a position that does not overlap the focus motor 64 when viewed in the optical axis direction, but as long as the interchangeable lens unit 2 can be made more compact, the focusing main shaft 58 and the focusing sub-shaft 59 may overlap the focus motor 64 when viewed in the optical axis direction.

(14) In the above embodiments, a moving frame is described using the moving frame 53 as an example, but the moving frame is not limited to being the moving frame 53. For example, as long as interference between the focusing sub-shaft 59 and the moving frame 53 can be avoided with another configuration, the moving frame 53 needs not have the holder 53*c*.

Also, the above-mentioned holder 53*c* is a pouch-like cylindrical component that is closed at one end, but the holder 53*c* may instead be a simple cylindrical portion or a through-hole.

(15) In the above embodiments, the electrical board 92 is fixed to the fourth lens support frame 56, but the interchangeable lens unit 2 can be made more compact even if the electrical board 92 is instead fixed to the lens mount 95 or some other member.

Also, in the above embodiments, the zoom motor 87 is fixed to the fourth lens support frame 56, but the interchangeable lens unit 2 can be made more compact even if the zoom motor 87 is instead fixed to the lens mount 95 or some other member. Similarly, the transmission mechanism 84 in the above embodiments is supported by the fourth lens support frame 56, but the interchangeable lens unit 2 can be made more compact even if the transmission mechanism 84 is instead supported by the lens mount 95 or some other member.

Furthermore, the focusing main shaft 58 in the above embodiments is fixed to the fourth lens support frame 56, but the focusing main shaft 58 may instead be fixed to some other member.

(16) In the above embodiments, a shaft support member is described using the first support cover 57 as an example, but the shaft support member is not limited to being the first support cover 57. The interchangeable lens unit 2 can be made more compact even if the first support cover 57 has some other shape instead.

(17) The zoom motor 87 in the above embodiments is disposed at a position that does not overlap the aperture drive motor 62*a* when viewed in the optical axis direction, but as long as the interchangeable lens unit 2 can be made more compact, the zoom motor 87 may overlap the aperture drive motor 62*a* when viewed in the optical axis direction.

Also, the focus motor 64 in the above embodiments is disposed at a position that does not overlap the aperture drive motor 62*a* when viewed in the optical axis direction, but as long as the interchangeable lens unit 2 can be made more compact, the focus motor 64 may overlap the aperture drive motor 62*a* when viewed in the optical axis direction.

(18) In the above embodiments, the restricting shaft 49*b*, which is one example of a restricting shaft, is disposed at a position that does not overlap the aperture unit 62 when viewed in the optical axis direction. However, as long as the interchangeable lens unit 2 can be made more compact, the restricting shaft 49*b* may overlap the aperture unit 62 when viewed in the optical axis direction.

(19) In the above embodiments, the cam follower 53*e*, which is one example of a first cam follower, is disposed on the outer peripheral side of the zoom motor 87 when viewed in the optical axis direction. However, the interchangeable lens unit 2 can be made more compact even if the cam follower 53*e* is not disposed on the outer peripheral side of the zoom motor 87 when viewed in the optical axis direction.

Also, in the above embodiments, the focus motor 64 is disposed in the circumferential direction between the cam follower 53*e* and the cam follower 53*f* when viewed in the optical axis direction. However, the interchangeable lens unit 2 can be made more compact even if the focus motor 64 is not disposed in the circumferential direction between the cam follower 53*e* and the cam follower 53*f* when viewed in the optical axis direction.

Furthermore, in the above embodiments, the central angle θ1 between the cam follower 53*e* and the cam follower 53*f* is greater than the central angle θ2 between the cam follower 53*f* and the cam follower 53*g*, and is greater than the central angle θ3 between the cam follower 53*e* and the cam follower 53*g*. However, the interchangeable lens unit 2 can be made more compact even if the central angle θ1 is not greater than the central angles θ2 or θ3, such as when the central angles θ1 to θ3 are the same.

(20) In the above embodiments, the moving frame 53 has the cut-out 53*d* formed between the cam followers 53*e* and 53*f*, and the focus motor 64 is disposed in the cut-out 53*d* when viewed in the optical axis direction. However, the focus motor 64 needs not be disposed in the cut-out 53*d*, and some other member may instead be disposed in the cut-out 53*d*.

The gear component 82 of the cam frame 80 passes through the cut-out 53*d* in the course of the moving frame 53 being guided in the optical axis direction by the cam frame 80. However, the interchangeable lens unit 2 can also be made more compact if the outer size of the moving frame 53 is made smaller so as to avoid the gear component 82.

(21) The rotational axis E1 of the zoom driveshaft 87*a* of the zoom motor 87 is disposed substantially in the circumferential direction of the cam frame 80, but the zoom motor 87 is not limited to having this layout. For example, the interchangeable lens unit 2 can be made more compact even if the rotational axis E1 of the zoom driveshaft 87*a* is not disposed in the circumferential direction of the cam frame 80.

(22) In the above embodiments, the gear component of a first frame is described using the gear component 82 of the cam frame 80 as an example, but the gear component is not limited to being the gear component 82. For example, the gear component 82 may have just the first gear component 82*a*, or just the second gear component 82*b*, instead of having both. Furthermore, the gear component 82 may have a portion other than the first gear component 82*a* and the second gear component 82*b*.

Also, the position of the gear component 82 in the optical axis direction is not limited to that in the above embodiments.

As long as the interchangeable lens unit 2 can be made more compact, the gear component 82 may be offset somewhat toward the image plane side or the subject side from the middle position of the main body 81 in the optical axis direction.

(23) In the above embodiments, a drive actuator is described using the zoom drive unit 45 as an example, but the drive actuator is not limited to being the zoom drive unit 45. The drive actuator may have some other configuration, so long as it rotationally drives the second frame with respect to the first frame.

(24) In the above embodiments, the zoom motor 87 and the transmission mechanism 84 go into the stowage space S, but as long as the stowage space S is effectively utilized in some way, and as a result the interchangeable lens unit 2 can be made more compact, the zoom motor 87 and the transmission mechanism 84 need not go into the stowage space S.

(25) In the above embodiments, part of the moving frame 53 goes into the stowage space S in the stowed state in which the cam frame 80 is closest to the base member 93 in the optical axis direction. However, as long as the stowage space S is effectively utilized in some way, and as a result the interchangeable lens unit 2 can be made more compact, the part of the moving frame 53 needs not go into the stowage space S.

(26) In the above embodiments, part of one of the three inner peripheral cam grooves 83*a* is disposed between the gear component 82 and the base member 93, but as long as the interchangeable lens unit 2 can be made more compact, the cam groove needs not be disposed between the gear component 82 and the base member 93. Conversely, all of one of the inner peripheral cam grooves 83*a* may be disposed between the gear component 82 and the base member 93, or at least part of another inner peripheral cam groove 83*a* may be disposed between the gear component 82 and the base member 93.

(27) In the above embodiments, the electrical board 92 is disposed on the inner peripheral side of the cam frame 80 when viewed in the optical axis direction. However, as long as the interchangeable lens unit 2 can be made more compact, the electrical board 92 may not be disposed on the inner peripheral side of the cam frame 80 when viewed in the optical axis direction. For example, the electrical board 92 may partly overlap the cam frame 80 when viewed in the optical axis direction.

(28) In the above embodiments, the first coil 46*a* and the second coil 46*b* are fixed on the image plane side of the moving frame 53, but may instead be fixed on the image plane side of the aperture unit 62. In this case, for example, the first coil 46*a* and the second coil 46*b* can be disposed close to the first magnet 54*a* and the second magnet 54*b*, respectively, by cutting out the region of the moving frame 53 that overlaps the first coil 46*a* and the second coil 46*b* in the optical axis direction, allowing an electromagnetic actuator to be constituted.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

REFERENCE SIGNS LIST

1 digital camera (one example of an imaging device)
2, 302 interchangeable lens unit (one example of a lens barrel)
2*a* lens housing (one example of a first frame)
3 camera body (one example of a camera body)
4 body mount
11 imaging sensor (one example of an imaging sensor)
45 zoom drive unit (one example of a drive actuator)
46 correction drive unit (one example of a correction drive unit)
49*a* rotational support shaft
49*b* restricting shaft (one example of a restricting shaft)
50 fixed frame (one example of an outer frame)
51 first lens support frame (one example of a first lens support frame)
52 front lens frame
53 moving frame (one example of a moving frame)
53*a* moving frame main body (one example of a moving frame main body)
53*d* cut-out (one example of a cut-out)
53*e* cam follower (one example of a first cam follower)
53*f*, 53*g* cam follower (one example of a second and third cam follower)
54 correction lens frame (one example of a correction frame)
55 third lens support frame (one example of a focus adjusting frame)
56 fourth lens support frame
57 first support cover (one example of a shaft support member)
58 focusing main shaft (one example of a guide member)
59 focusing sub-shaft (one example of a rotation restricting member)
62 aperture unit (one example of an aperture unit)
62*a* aperture drive motor (one example of an aperture drive motor)
62*c* aperture vane (one example of an aperture vane)
64 focus motor (one example of a second actuator)
64*a* focus driveshaft (one example of a rotating shaft)
80 cam frame (one example of a second frame)
81 main body (one example of a main body)
82 gear component (one example of a gear component)
82*a* first gear component (one example of a first gear component)
82*b* second gear component (one example of a second gear component)
83 guide cam follower
83*a* inner peripheral cam groove
83*b* outer peripheral cam groove
84 transmission mechanism (one example of a transmission mechanism)
85 first transmission gear (one example of a first transmission gear member)
86 second transmission gear (one example of a second transmission gear member)
86*a* first intermediate gear (one example of a first intermediate gear)
86*b* second intermediate gear (one example of a second intermediate gear)
87 zoom motor (one example of a first actuator)
88 zoom lever unit
89 zoom lever (one example of a manipulation member)
389 zoom ring (one example of a manipulation member)
388*a* stop ring

What is claimed is:

1. A lens barrel comprising:

a first frame through which an optical axis passes;

a second frame supported by the first frame, the second frame configured to be rotatable about the optical axis and having a gear component provided on an inner periphery;

a first actuator mounted to the first frame and arranged inside of the second frame, the first actuator being configured to output a driving force; and a transmission mechanism configured to transmit the output driving force to the second frame via the gear component.

2. The lens barrel according to claim 1, wherein the first actuator is disposed substantially parallel to a plane perpendicular to the optical axis.

3. The lens barrel according to claim 1, wherein the transmission mechanism is configured to reduce an output speed of the first actuator so that the driving force is transmitted to the gear component via the reduced output speed of the first actuator.

4. The lens barrel according to claim 3, wherein the first actuator has a driveshaft that outputs the drive force, and the transmission mechanism is configured to reduce an output speed of the driveshaft so that the driving force is transmitted to the gear component via the reduced output speed of the driveshaft.

5. The lens barrel according to claim 3, wherein the transmission mechanism includes a first transmission gear member and a second transmission gear member, the first transmission gear member is configured to mesh with the gear component of the second frame, and the second transmission gear member is configured to mesh with the first transmission gear member to transmit the driving force from the first actuator to the first transmission gear member.

6. The lens barrel according to claim 5, wherein the first transmission gear member has a rotational axis that is parallel to the direction of the optical axis, and the second transmission gear member has a rotational axis that extends in a direction different from the direction of the optical axis.

7. The lens barrel according to claim 5, wherein the second transmission gear member has a rotational axis that is inclined with respect to a plane that is perpendicular to the optical axis.

8. The lens barrel according to claim 7, wherein the first actuator includes an output gear that produces the driving force, the second transmission gear member includes a first intermediate gear and a second intermediate gear, the first intermediate gear is configured to mesh with the output gear of the first actuator, and the second intermediate gear includes a worm gear configured to mesh with the first transmission gear member, and the rotational axis of the second transmission gear member is inclined with respect to the plane that is perpendicular to the optical axis substantially by the same angle as a lead angle of the second intermediate gear.

9. The lens barrel according to claim 8, wherein the first frame includes a base member that supports the first actuator, the output gear of the first actuator is disposed between the base member and the first intermediate gear of the second transmission gear member, and the second intermediate gear of the second transmission gear member is disposed closer to the base member than the first intermediate gear.

10. The lens barrel according to claim 5, further comprising:

a focus adjusting frame movably disposed along the direction of the optical axis with respect to the first frame;

a focus lens group fixed to the focus adjusting frame;

a second actuator configured to output a driving force to drive the focus adjusting frame along the direction of the optical axis;

a guide member fixed to the first frame and configured to guide the focus adjusting frame along the optical axis;

a restricting member configured to restrict rotation of the focus adjusting frame around the guide member with respect to the first frame; and a shaft support member fixed to the first frame, wherein both ends of the guide member are supported by the first frame and the shaft support member, and the first transmission gear member is rotatably supported by the first frame and the shaft support member.

11. The lens barrel according to claim 3, wherein the second frame includes a main body having a substantially cylindrical shape, the gear component of the second frame is mounted on an inner peripheral surface of the main body, and the first actuator and the transmission mechanism are disposed on the inner peripheral surface side of the main body.

12. The lens barrel according to claim 11, wherein the gear component of the second frame is disposed along the direction of the optical axis and positioned somewhat centrally between opposing ends of the substantially cylindrical main body, and at least one of the first actuator and the transmission mechanism is disposed more toward an image plane than the gear component of the second frame.

13. The lens barrel according to claim 1, further comprising:

a first lens frame supported by the first frame along the direction of the optical axis, rotation of the first lens frame being restricted by the first frame; and a first lens group fixed to the first lens frame, wherein the first lens frame is driven along the direction of the optical axis by the second frame when the second frame is rotated with respect to the first frame.

14. The lens barrel according to claim 1, wherein the second frame is guided by the first frame along the direction of the optical axis.

15. The lens barrel according to claim 1, further comprising:

a focus adjusting frame configured to move along the direction of the optical axis with respect to the first frame;

a focus lens group fixed to the focus adjusting frame; and a second actuator configured to output a driving force, the second actuator being further configured to drive the focus adjusting frame along the direction of the optical axis.

16. The lens barrel according to claim 15, wherein the second actuator includes a rotating shaft disposed substantially parallel to the optical axis.

17. The lens barrel according to claim 15, further comprising:

an electrical contact fixed to the first frame and electrically connectable to an external device; and an electrical board fixed to the first frame and electrically connected to the electrical contact, wherein at least one of the first actuator and the second actuator being disposed not to overlap at least one of the electrical contact and the electrical board when viewed in the optical axis direction.

18. The lens barrel according to claim 17, wherein the electrical board, the first actuator, and the second actuator are positioned not to overlap each other when viewed along the optical axis.

19. The lens barrel according to claim 15, further comprising:

a guide member fixed to the first frame and configured to guide the focus adjusting frame along the direction of the optical axis; and a restricting member configured to restrict rotation of the focus adjusting frame around the guide member with respect to the first frame, wherein the restricting member being disposed not to overlap at least one of the first actuator and the second actuator when viewed in the optical axis direction.

20. The lens barrel according to claim 19, wherein the first actuator and the second actuator are disposed between the guide member and the restricting member.

21. The lens barrel according to claim 19, further comprising:

a movable frame defining an interior space with an opening, the movable frame including a main body movably supported by the second frame along the direction of the optical axis, the interior space with the opening being provided to allow a part of the restricting member to be inserted into the interior space along the direction of the optical axis when the main body of the moving frame approaches the focus adjusting frame.

22. The lens barrel according to claim 15, further comprising:

a correction frame movably disposed with respect to the first frame along a plane perpendicular to the optical axis;

a correction lens fixed to the correction frame; and a correction drive unit configured to drive the correction frame along the plane perpendicular to the optical axis, wherein at least one of the first actuator and the second actuator being disposed not to overlap the correction drive unit when viewed along the direction of the optical axis.

23. The lens barrel according to claim 15, further comprising:

an aperture unit including a plurality of aperture vanes and an aperture drive actuator, the aperture unit being movably disposed along the direction of the optical axis with respect to the first frame, the plurality of aperture vanes being configured to change a path of light passing through the lens barrel, and the aperture drive actuator being configured to adjust the amount of light by controlling the position of the aperture vanes, wherein at least one of the first actuator and the second actuator being disposed not to overlap the aperture drive actuator when viewed along the direction of the optical axis.

24. The lens barrel according to claim 15, wherein the focus adjusting frame is movably supported by the first frame along the direction of the optical axis, and the second actuator includes a rotating shaft that has a lead screw that meshes with the focus adjusting frame.

25. The lens barrel according to claim 15, further comprising:

a movable frame including a first cam follower, a second cam follower, and a third cam follower, the movable frame configured to be guided by the second frame along the direction of the optical axis, wherein the second frame includes a first cam groove configured to guide the first cam follower, a second cam groove configured to guide the second cam follower, and a third cam groove configured to guide the third cam follower, the first cam follower being disposed on an outer peripheral side of the first actuator when viewed along the direction of the optical axis.

26. The lens barrel according to claim 25, wherein the second actuator is disposed along the circumferential direction of the movable frame between the first cam follower and the second cam follower when viewed along the direction of the optical axis.

27. The lens barrel according to claim 25, wherein a central angle formed between the first cam follower and the second cam follower is greater than a central angle formed between the first cam follower and the third cam follower, and the central angle formed between the first cam follower and the second cam follower is greater than a central angle formed between the second cam follower and the third cam follower.

28. The lens barrel according to claim 25, wherein the movable frame defines an open space extending along the circumferential direction between the first cam follower and the second cam follower, and the second actuator being disposed within the open space when viewed along the direction of the optical axis.

29. The lens barrel according to claim 28, wherein the second frame has a gear component that passes through the open space of the movable frame while the movable frame is being guided along the direction of the optical axis by the second frame.

30. The lens barrel according to claim 1, further comprising:

a movable frame configured to be guided in the optical axis direction by the second frame;

an aperture unit including a plurality of aperture vanes and an aperture drive actuator, the aperture unit being disposed along the direction of the optical axis and configured to move integrally with the movable frame to adjust the amount of light passing through the lens barrel, the plurality of aperture vanes being configured to change a path of light passing through the lens barrel, and the aperture drive actuator being configured to adjust the amount of light by controlling the position of the aperture vanes;

a correction frame disposed along the direction of the optical axis and configured to move integrally with the movable frame, the correction frame being movably supported by the movable frame along a plane perpendicular to the optical axis;

a correction lens fixed to the correction frame; and a correction drive unit configured to move the correction frame along a plane perpendicular to the optical axis.

31. The lens barrel according to claim 30, wherein the aperture drive actuator is disposed along the direction of the optical axis and configured to move integrally with the movable frame, the aperture drive being disposed not to overlap the correction drive unit when viewed along the optical axis.

32. The lens barrel according to claim 30, wherein the movable frame includes a restricting shaft configured to restrict the range of movement of the correction frame with respect to the movable frame, the restricting shaft being disposed so as not to overlap the aperture unit when viewed along the direction of the optical axis.

33. The lens barrel according to claim 1, further comprising:

an electrical contact fixed to the first frame and electrically connectable to an external device;

an electrical board fixed to the first frame and electrically connected to the electrical contact; and a rear lens element fixed to the first frame, wherein the first frame further includes a lens mount and a lens support frame fixed to the lens mount, the rear lens element is fixed to the lens support frame of the first frame, and the electrical board is fixed to the lens support frame of the first frame.

34. The lens barrel according to claim 33, wherein the first actuator is fixed to the lens support frame.

35. The lens barrel according to claim 15, further comprising:

a guide member having a first end and a second end, the guide member being fixed to the first frame and configured to guide the focus adjusting frame along the direction of the optical axis;

a restricting member configured to restrict rotation of the focus adjusting frame around the guide member with respect to the first frame;

a rear lens element fixed to the first frame; and a shaft support member fixed to the first frame, wherein the first frame further includes a lens mount and a lens support frame fixed to the lens mount, the rear lens element being fixed to the lens support frame, the first end of the guide member being supported by the shaft support member and the second end of the guide member being supported by the lens support frame.

36. The lens barrel according to claim 35, wherein the shaft support member is fixed to the lens support frame of the first frame.

37. The lens barrel according to claim 1, wherein the first actuator is a DC actuator.

38. The lens barrel according to claim 1, wherein a lengthwise direction of the first actuator is substantially disposed along a circumferential direction of the second frame.

39. The lens barrel according to claim 1, further comprising:

a first lens frame supported by the first frame along the direction of the optical axis, rotation of the first lens frame being restricted by the first frame; and a movable frame configured to be guided by the second frame in the optical axis direction, wherein at least one of the first lens frame and the movable frame, when not in use, is configured to move more towards an image plane side than when the at least one of the first lens frame and the movable frame when in use moves in the optical axis direction, with respect to the first frame.

40. An imaging device comprising:

the lens barrel according to claim 1; and an imaging element configured to convert an optical image formed by the lens barrel into image data.

41. A lens barrel comprising:

a first frame including an optical axis;

a second frame supported by the first frame and configured to rotate about the optical axis;

a first actuator mounted to the first frame and, when viewed along the direction of the optical axis, disposed adjacent to an inner peripheral side of the second frame, the first actuator being configured to output a driving force;

a transmission mechanism configured to transmit the driving force to the second frame;

a focus adjusting frame configured to move along the direction of the optical axis with respect to the first frame;

a focus lens group fixed to the focus adjusting frame;

a second actuator configured to output a driving force, the second actuator being further configured to drive the focus adjusting frame along the direction of the optical axis;

an electrical contact fixed to the first frame and electrically connectable to an external device; and an electrical board fixed to the first frame and electrically connected to the electrical contact, wherein the lengthwise direction of the first actuator being oriented differently than the direction of the optical axis; and wherein at least one of the first actuator and the second actuator being disposed not to overlap at least one of the electrical contact and the electrical board when viewed in the optical axis direction.

* * * * *